(12) United States Patent
Zhou et al.

(10) Patent No.: US 12,034,168 B2
(45) Date of Patent: Jul. 9, 2024

(54) COMPOSITE OF COBALT-BASED PEROVSKITE MATERIAL WITH NEGATIVE THERMAL EXPANSION MATERIAL, AND PREPARATION METHOD OF SAME, AND SOLID OXIDE FUEL CELL COMPRISING SAME

(71) Applicant: NANJING TECH UNIVERSITY, Jiangsu (CN)

(72) Inventors: Wei Zhou, Jiangsu (CN); Yuan Zhang, Jiangsu (CN); Chuan Zhou, Jiangsu (CN); Guangming Yang, Jiangsu (CN); Zongping Shao, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 350 days.

(21) Appl. No.: 17/666,402

(22) Filed: Feb. 7, 2022

(65) Prior Publication Data
US 2022/0263097 A1    Aug. 18, 2022

(30) Foreign Application Priority Data
Feb. 7, 2021 (CN) .......................... 202110167529.2

(51) Int. Cl.

| | |
|---|---|
| H01M 4/90 | (2006.01) |
| C04B 35/495 | (2006.01) |
| C04B 35/626 | (2006.01) |
| C04B 35/64 | (2006.01) |
| H01M 4/86 | (2006.01) |
| H01M 8/12 | (2016.01) |
| H01M 8/1246 | (2016.01) |

(52) U.S. Cl.
CPC ......... *H01M 4/9033* (2013.01); *C04B 35/495* (2013.01); *C04B 35/6261* (2013.01); *C04B 35/62645* (2013.01); *C04B 35/64* (2013.01); *H01M 8/1246* (2013.01); *C04B 2235/326* (2013.01); *C04B 2235/3275* (2013.01); *C04B 2235/6567* (2013.01); *C04B 2235/768* (2013.01); *C04B 2235/9607* (2013.01); *H01M 2004/8689* (2013.01); *H01M 2008/1293* (2013.01); *H01M 2300/0074* (2013.01)

(58) Field of Classification Search
CPC . H01M 4/9033; H01M 8/1246; C04B 35/495; C04B 35/6261; C04B 35/62645; C04B 35/64
See application file for complete search history.

(56) References Cited

PUBLICATIONS

Fei Lu et al., "Application of a negative thermal expansion oxide in SOFC cathode," Ceramics International, vol. 47, Aug. 2020, pp. 1095-1100.

*Primary Examiner* — Sarah A. Slifka
(74) *Attorney, Agent, or Firm* — JCIP GLOBAL INC.

(57) ABSTRACT

The present invention relates to a composite of a cobalt-based perovskite material with a negative thermal expansion material, and a preparation method of the same, and a solid oxide fuel cell (SOFC) comprising the same, and belongs to the technical field of fuel cells. In the present invention, a negative thermal expansion material is introduced into a cobalt-based perovskite oxide to successfully prepare an SOFC cathode material with excellent electrochemical performance and low thermal expansivity. The composite electrode achieves prominent mechanical tolerance in SOFC, which can moderate a volume change during the whole calcination process and enable a smooth transition to a high-temperature stage. The composite electrode has a thermal expansion coefficient (TEC) only of $12.9 \times 10^{-6}$ K$^{-1}$, which is perfectly matched with that of an SDC electrolyte. In addition, the composite shows excellent oxygen reduction reaction (ORR) activity, high TEC, and extremely-excellent anti-$CO_2$ poisoning performance.

5 Claims, 29 Drawing Sheets

COMPOSITE OF COBALT-BASED PEROVSKITE MATERIAL WITH NEGATIVE THERMAL EXPANSION MATERIAL, AND PREPARATION METHOD OF SAME, AND SOLID OXIDE FUEL CELL COMPRISING SAME

CROSS-REFERENCE TO RELATED APPLICATION

This application claims the priority benefit of China application serial no. 202110167529.2, filed on Feb. 7, 2021. The entirety of the above-mentioned patent application is hereby incorporated by reference herein and made a part of this specification.

TECHNICAL FIELD

The present invention relates to a composite of a cobalt-based perovskite material with a negative thermal expansion material, and a preparation method of the same, and a solid oxide fuel cell (SOFC) comprising the same, and belongs to the technical field of fuel cells.

BACKGROUND

Although SOFC has promising commercial application prospects, manufacturing and use costs of SOFC are too high at present and have not yet reached the commercialization requirements, and a too-high operating temperature is a key factor causing the high costs. Moreover, the too-high operating temperature limits the application of SOFCs in portable devices, making SOFCs lose the mass market. Therefore, reducing the operating temperature is the development tendency of SOFCs. If medium-temperature and low-temperature SOFCs are developed and the operating temperature is lowered, the thermal cycling stability can be significantly improved and cheap connector materials can be used, which reduces the manufacturing cost of SOFCs, expands the market share of SOFCs, and promotes the commercialization of SOFCs. The development and preparation of key materials for low-temperature SOFCs is a bottleneck restricting the development of SOFCs. Significant progress has been made in the optimization of electrolyte materials by reducing the electrolyte thickness and adopting new high-ion-conductivity materials. Although a lot of research has been conducted in the optimization of electrodes, especially the cathode, there is still a long way to go in terms of meeting the requirements of SOFC commercialization. The problems hindering the practical application of medium-temperature and low-temperature SOFC cathode materials mainly focus on the following three aspects: (1) low electrochemical performance; (2) large thermal expansion coefficient (TEC); and (3) poor anti-$CO_2$ poisoning performance. As an attractive energy conversion technology with high efficiency, fuel flexibility, and low emission, SOFCs have not yet been widely used due to many technical barriers (especially insufficient operational stability). The intolerance of SOFC cathode materials to $CO_2$ will affect their stability under operating conditions, and due to the rigidity of perovskite oxide materials, the mismatch in thermal expansion behaviors among different cell components will introduce a large internal strain, resulting in layering during an operation or thermal cycling process. Electrode layering is the main cause of SOFC performance degradation, and may even lead to SOFC device damage and operational safety issues.

The main challenge in developing oxygen reduction electrode (ORE) materials of IT-SOFC is to achieve the high ORR activity of ORE materials and the durability of the ORE materials in long-term stable operations. Due to the special electron-transport system and catalytic performance of cobalt, the most popular ORE materials for IT-SOFC are cobalt-containing perovskites, including $Sm_{0.5}Sr_{0.5}CoO_{3-\delta}$, (La, Sr)(Co, Fe) $O_{3-\delta}$, $Ba_{0.5}Sr_{0.5}Co_{0.8}Fe_{0.2}O_{3-\delta}$ (BSCF), and $SrNb_{0.1}Co_{0.9}O_{3-\delta}$ (SNC). New B-site double-doped perovskite cathode materials $SrSc_{0.025}Nb_{0.175}Co_{0.8}O_{3-\delta}$ (SSNC) and $SrTa_{0.1}Nb_{0.1}Co_{0.8}O_{3-\delta}$ (STNC) have been successfully developed, which can further reduce the operating temperature of SOFC to 500° C. or lower. Studies have shown that the co-doping of Sc and Nb or Ta and Nb can greatly reduce the diffusion energy barrier of oxygen ions in a perovskite bulk phase and increase the number of oxygen vacancies, resulting in superior oxygen reduction catalytic activity. Although these perovskite cathodes have high electrochemical activity, such materials usually have a large TEC, usually in a range of 20 to $25 \times 10^{-6}$ $K^{-1}$. For example, BSCF has a TEC of $24 \times 10^{-6}$ $K^{-1}$, which is much larger than that of SDC or YSZ electrolytes (11.2 to $12.3 \times 10^{-6}$ $K^{-1}$). High TEC is due to the dramatic increase in an ionic radius caused by the reduction of cobalt ions at a high temperature and the upgrade of a spin state of d orbital electrons. When the operational stability (durability) of fuel cells is discussed, for perovskite oxide cathode materials, TEC is one of the important parameters to measure the practical application values of a material. Medium-temperature and low-temperature SOFCs may have an operating temperature roughly of 500° C. to 700° C., and in this temperature range, electrode materials, electrolytes, and connectors will experience volume expansion to varying degrees, because a stress caused by the TEC mismatch will cause an electrode to fall off from an electrolyte and make a cell deform, leak, or even crack, which will seriously affect the life span, work safety, and stability of the cell.

SUMMARY OF INVENTION

In the present invention, negative thermal expansion (NTE) oxides $ZrW_2O_8$ and $Y_2W_3O_{12}$ are used as starting materials, and structures and compositions thereof are optimized to obtain new NTE materials with high oxygen ion-conductivity and NTE characteristics.

In the present invention, a material with NTE properties is introduced to combine with the $SrNb_{0.1}Co_{0.9}O_{3-\delta}$ (SNC) perovskite, where a hedging effect of positive and negative TECs will play a role in greatly adjusting the thermal expansivity of a cathode, such that a product can have a TEC perfectly matching various electrolytes.

A first aspect of the present invention provides the following.

A composite of a cobalt-based perovskite material with a negative thermal expansion material is provided, which is obtained by combining the negative thermal expansion material with the cobalt-based perovskite material.

In an embodiment, the negative thermal expansion material is $Y_2W_3O_{12}$ (YWO), and the cobalt-based perovskite material is $SrNb_{0.1}Co_{0.9}O_{3-\delta}$ (SNC). In an embodiment, the cobalt-based perovskite material also includes $Sr_x(Nb_{0.1}Co_{0.9}Y_y)O_{3-\delta}$ (SYNC) and $SrWO_4$.

In an embodiment, the negative thermal expansion material is $ZrW_2O_8$ (ZWO), and the cobalt-based perovskite material further includes $SrWO_4$ and $CoWO_4$.

A preparation method of the composite of the cobalt-based perovskite material with the negative thermal expansion material is provided, including the following steps: mixing the negative thermal expansion material and the cobalt-based perovskite material to obtain a precursor material, and subjecting the precursor material to calcination.

In an embodiment, a content of the negative thermal expansion material in the precursor material is 5 wt % to 40 wt % and preferably 10 wt % to 20 wt %.

In an embodiment, the calcination is conducted at 600° C. to 1,000° C. for 1 h to 6 h, and is preferably conducted at 650° C. to 800° C. for 2 h.

In an embodiment, the $SrNb_{0.1}Co_{0.9}O_{3-\delta}$ (SNC) perovskite material is prepared by taking $Sr(NO_3)_2$, $C_{10}H_5NbO_{20}$, and $Co(NO_3)_2\cdot 6H_2O$ according to a predetermined molecular stoichiometric ratio to prepare a solid precursor by a citrate-ethylenediamine tetraacetic acid (EDTA) complexing method, and subjecting the solid precursor to calcination, and the SNC perovskite material can also be prepared by a solid-phase reaction.

In an embodiment, the calcination is conducted at 1,000° C. for 5 h.

In an embodiment, the $Y_2W_3O_{12}$ (YWO) or $ZrW_2O_8$ (ZWO) is prepared by taking $Y_2O_3$ and/or ZrO and $WO_3$ powders as raw materials according to a stoichiometric ratio, mixing the powders to obtain a resulting mixture, and subjecting the resulting mixture to ball-milling and then calcination.

In an embodiment, the ball-milling is conducted at a rotational speed of 400 rpm with ethanol as a solvent, and the calcination is conducted at 1,100° C. for 5 h.

A second aspect of the present invention provides the following.

Use of the composite of the cobalt-based perovskite material with the negative thermal expansion material in the manufacture of an SOFC is provided.

A third aspect of the present invention provides the following.

Use of the negative thermal expansion material in the manufacture of a cathode material of an SOFC is provided.

In an embodiment, the negative thermal expansion material is used to reduce the TEC and resistance of the cathode material, improve the ORR electrical activity and anti-$CO_2$ poisoning performance of the cathode material, increase oxygen vacancies on the surface of the cathode material, increase a power density of the SOFC, or enhance the tolerance of the SOFC to heating-cooling cycles.

Beneficial Effects

In the present invention, a negative thermal expansion material is introduced into a perovskite oxide to successfully prepare an SOFC cathode material with excellent electrochemical performance and low thermal expansivity. A phase reaction between YWO and SNC can change the surface morphology of a host material from smooth particles to fine particles, and impurities such as $SrWO_4$ will be precipitated and attached to the surface of the material. When an interfacial phase reaction occurs between SNC and YWO, during the formation of $SrWO_4$, Sr is escaped from the perovskite main phase, causing deficiencies in A-site cations of the perovskite, and Y is doped into the B-site of the perovskite main phase, thereby forming A-site deficient $Sr_x(Nb_{0.1}Co_{0.9}Y_y)O_{3-\delta}$ (SYNC).

The novel composite electrode achieves prominent mechanical tolerance in SOFC, and mechanical performance changes of c-SYNC during calcination are explored through in-situ TEC, which can moderate a volume change during the whole calcination process and enable a smooth transition to a high-temperature stage. The composite electrode has a TEC only of $12.9\times10^{-6}\,K^{-1}$, which is perfectly matched with that of an SDC electrolyte.

Through the combination with YWO, the resistance of SNC+YWOx is improved due to the phase reaction, which gradually increases with the increase of a YWO proportion. Area-specific resistance (ASR) values of SNC+YWO10 and SNC+YWO20 at 600° C. are 0.052 $\Omega cm^2$ and 0.059 $\Omega cm^2$, respectively, indicating that the resistance of the materials is significantly reduced. The precipitation of $SrWO_4$ and the generation of A-site deficiencies in the perovskite structure greatly enhance the ORR activity.

SNC+YWOx shows high ORR activity, large TEC, and prominent anti-$CO_2$ poisoning performance. After 10 vol. % $CO_2$ is introduced at 600° C. and ASR is continuously monitored for 60 min, an ASR value of SNC+YWO20 (about 1.75 $\Omega cm^2$) is less than half of a resistance value of an SNC cathode (about 4.13 $\Omega cm^2$).

The long-term tolerance and ORR activity of the c-SYNC cathode are greatly improved, which demonstrates the effectiveness of the proposed thermal expansion compensation strategy to introduce an NTE material. This strategy combines the low TEC of the C-SYNC cathode and the high ORR activity caused by the in situ formation of uniformly-distributed c-SYNC particles. It turns out that the introduction of NTE YWO into a cathode is a simple, effective, and versatile strategy for developing durable and high-performance SOFCs.

DESCRIPTION OF EMBODIMENTS

Material Synthesis

1. Preparation of SNC materials: $Sr(NO_3)_2$, $C_{10}H_5NbO_{20}$, and $Co(NO_3)_2 \cdot 6H_2O$ are mixed according to a predetermined stoichiometric ratio to obtain a resulting solution, and then the resulting solution is mixed with EDTA-$NH_3$ and citric acid to obtain a solution with a pH of about 6 to 7, and the solution is subjected to evaporation for 5 h to obtain an SNC powder precursor (Evaluation of the $CO_2$ Poisoning Effect on a Highly Active Cathode $SrSc_{0.175}Nb_{0.025}Co_{0.8}O_{3-\delta}$ in the Oxygen Reduction Reaction [J]. Acs Applied Materials & Interfaces, 2016, 8 (5): 3003). The solid precursor of SNC is calcined in air at 1,000° C. for 5 h to obtain a final powder. The SNC materials can also be prepared by a solid-phase method, and a specific preparation process can be seen in existing relevant technical documents, such as Wei, Zhou, and, et al. Structural, electrical and electrochemical characterizations of $SrNb_{0.1}Co_{0.9}O_{3-\delta}$ as a cathode of solid oxide fuel cells operating below 600° C. [J]. International Journal of Hydrogen Energy, 2010.

2. Preparation of negative thermal expansion materials: YWO is prepared as follows: $Y_2O_3$ and $WO_3$ powders are mixed, and the resulting mixture is subjected to ball-milling at a rotational speed of 400 rpm with ethanol as a solvent, then dried, and calcined in air at 1,100° C. for 5 h to obtain an YWO powder. Similarly, ZWO is prepared by the same method with ZrO and $WO_3$ powders as raw materials.

3. Preparation of SOFC composite cathode materials: An appropriate amount of YWO (or ZWO) is mixed with SNC, and the resulting mixture is calcined in air at 800° C. for 2 h to obtain a c-SYNC composite powder.

Figure 1:
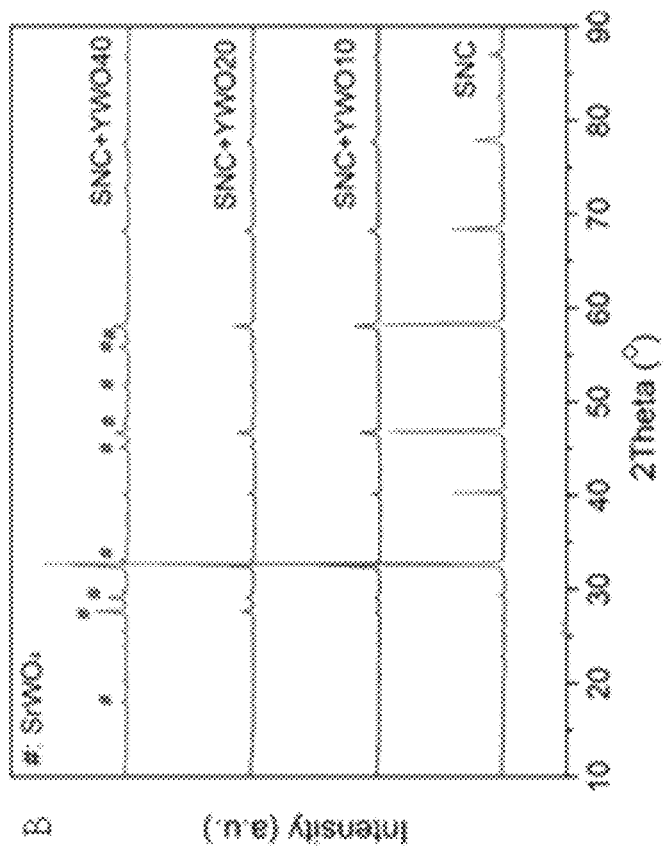
FIG. 1 shows X-ray diffractometry (XRD) patterns of SNC+ZWOx (x=10 wt %, 20 wt %, and 40 wt %)/SNC+YWOx (x=10 wt %, 20 wt %, and 40 wt %) calcined at 800° C. for 2 h.
Figure 1:
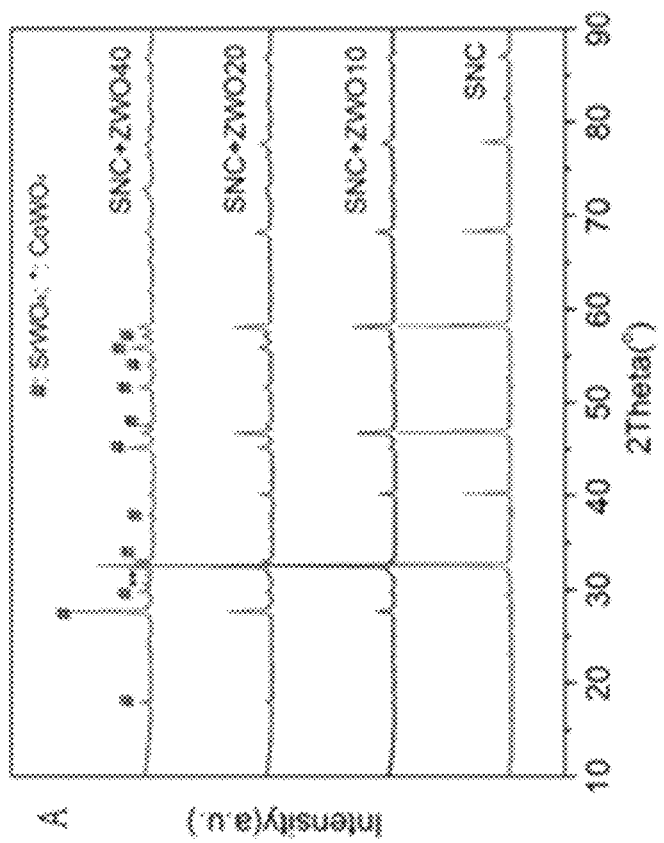

XRD Characterization $ZrW_2O_8$ (ZWO) is a phase-forming powder obtained by weighing and mixing corresponding oxides according to a predetermined stoichiometric ratio, and calcining the resulting mixture at 1,150° C. for 20 h (high-temperature solid phase process), and $Y_2W_3O_{12}$ (YWO) is also a phase-forming powder obtained by calcining at 1,200° C. for 20 h (high-temperature solid phase process). The host material $SrNb_{0.1}Co_{0.9}O_{3-\delta}$ (SNC) is synthesized by the EDTA-CA method, and calcination is conducted at 1,000° C. for 5 h to form a phase. SNC is mixed with ZWO or YWO according to different ratios to prepare composite cathode materials (which are represented by SNC+ZWOx (x=10 wt %, 20 wt %, and 40 wt %) and SNC+YWOx (x=10 wt %, 20 wt %, and 40 wt %)), and the resulting mixture is mechanically mixed by ball-milling, dried, and calcined at 800° C. for 2 h to allow the two phases to be fully combined. Then an XRD test is conducted to determine changes of phase structures, as shown in FIG. 1. From the comparison in the figure, it can be concluded that SNC undergoes an obvious phase reaction with both ZWO and YWO at a high temperature, the phase reaction intensifies with the increase in a proportion of the NTE material, and $SrWO_4$ and $CoWO_4$ are generated. Only the $SrWO_4$ phase is found in the composite of YWO with SNC, but both the $SrWO_4$ and $CoWO_4$ phases are found in the composite of ZWO with SNC, and an impurity phase generated by the phase reaction has a very strong peak intensity, indicating that the phase reaction is intense, and the difference in phase structure may lead to differences in the oxygen reduction activity and performance of the two.

Figure 2:
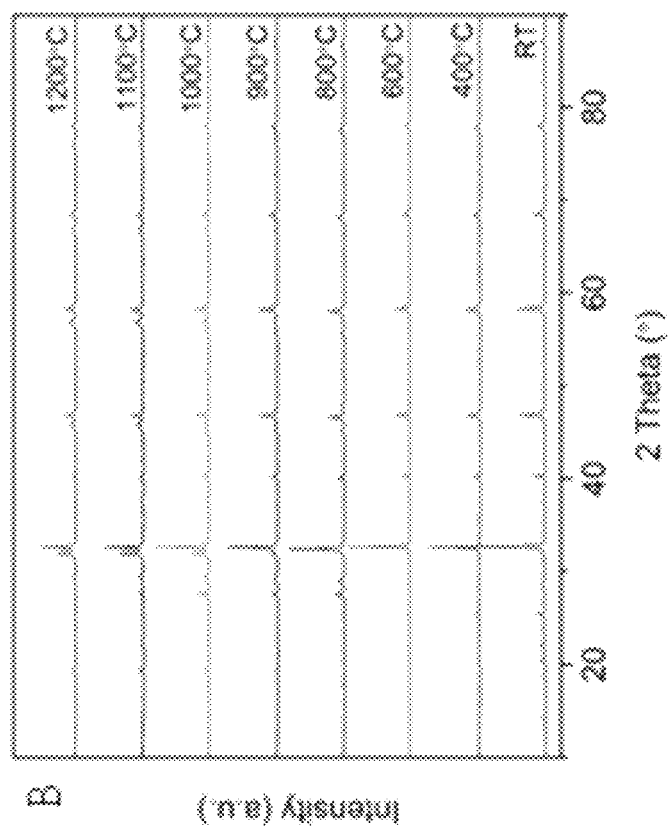
FIG. 2 shows XRD patterns of SNC+ZWO20/SNC+YWO20 samples calcined at 400° C. to 1,200° C. for 2 h.
Figure 2:
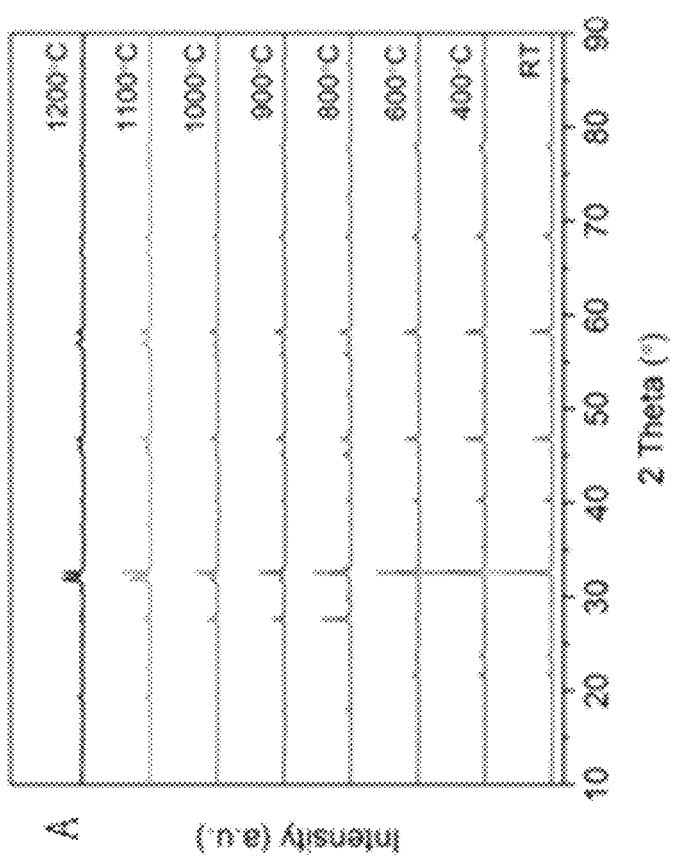

In order to study the impact of temperature on the phase reactions in the composites, an SNC+ZWOx composite and an SNC+YWOx composite (x=20 wt %) are taken and each calcined for 2 h at different temperatures, and then the changes of phase structures are studied by XRD characterization. FIG. 2 shows XRD patterns of SNC+ZWO20/SNC+YWO20 samples calcined at 400° C. to 1,200° C. for 2 h, and it can be seen from curves in the figure that there is almost no phase reaction between the host material and the NTE material at a temperature of 800° C. or lower. However, a preparation process of an SOFC cathode material must involve high-temperature calcination, and thus high-temperature phase reactions are inevitable. When $SrWO_4$ generated at 800° C. is at 1,000° C., a corresponding peak gradually weakens, indicating that the component is decomposed at the decomposition temperature, and then new impurity phases are generated in both SNC+ZWO20 and SNC+YWO20: tetragonal crystal $Sr(CoW)_5O_3$, P4 mm space group structure (PDF #74-2464), and cubic crystal $Sr_2CoWO_6$, Fm-3m space group structure (PDF #74-2470). However, it can be seen through comparison that, in SNC+ZWO20, at a high temperature, the phase reaction between SNC and ZWO is intense, the SNC peak is significantly weakened, and the main phase is difficult to maintain and is mostly replaced by an impurity phase, and in SNC+YWO20, at a high temperature, the phase reaction is moderate and the main phase peak still exists. It can be inferred that the ORR activity of the two composites may be affected at high temperatures, and thus reducing a calcination temperature for electrode preparation can avoid this problem.

SEM Characterization

Figure 3:
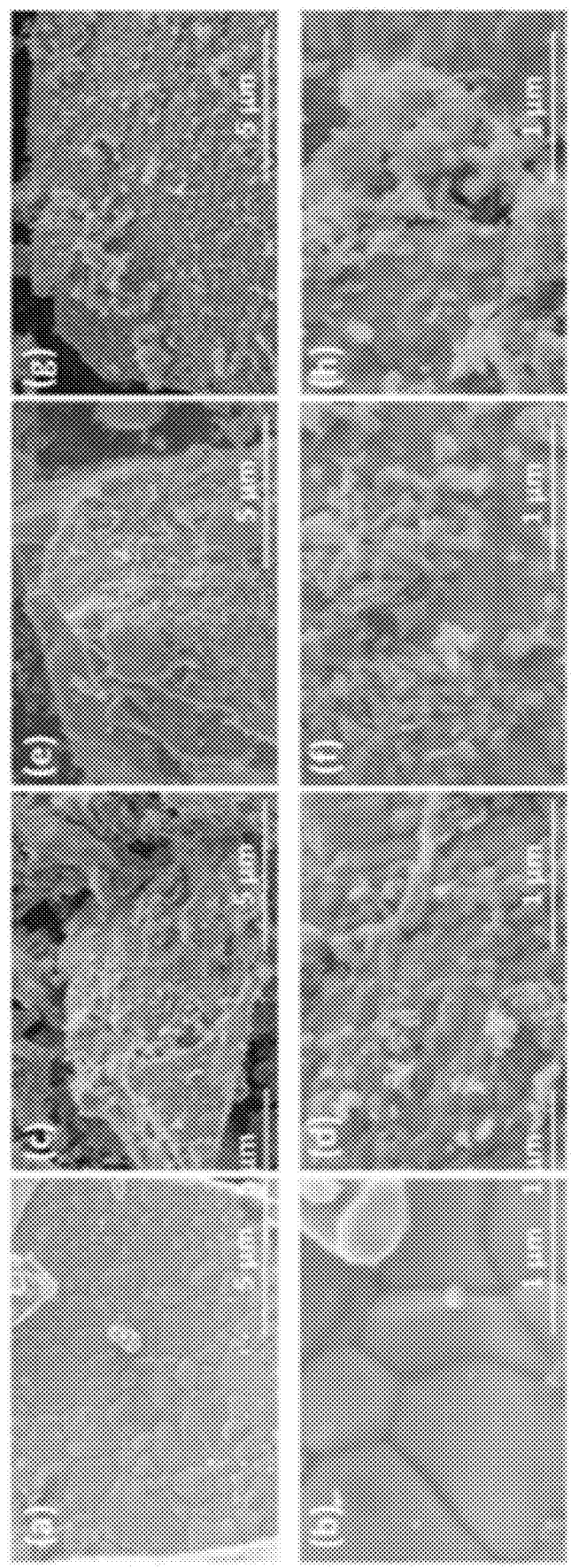
FIG. 3 shows scanning electron microscopy (SEM) images of surfaces of SNC+ZWOx (x=0 wt %, 10 wt %, 20 wt %, and 40 wt %) powders calcined in air at 800° C. for 2 h, where (a and b) x=0, (c and d) x=10, (e and f) x=20, and (g and h) x=40.
Figure 4:
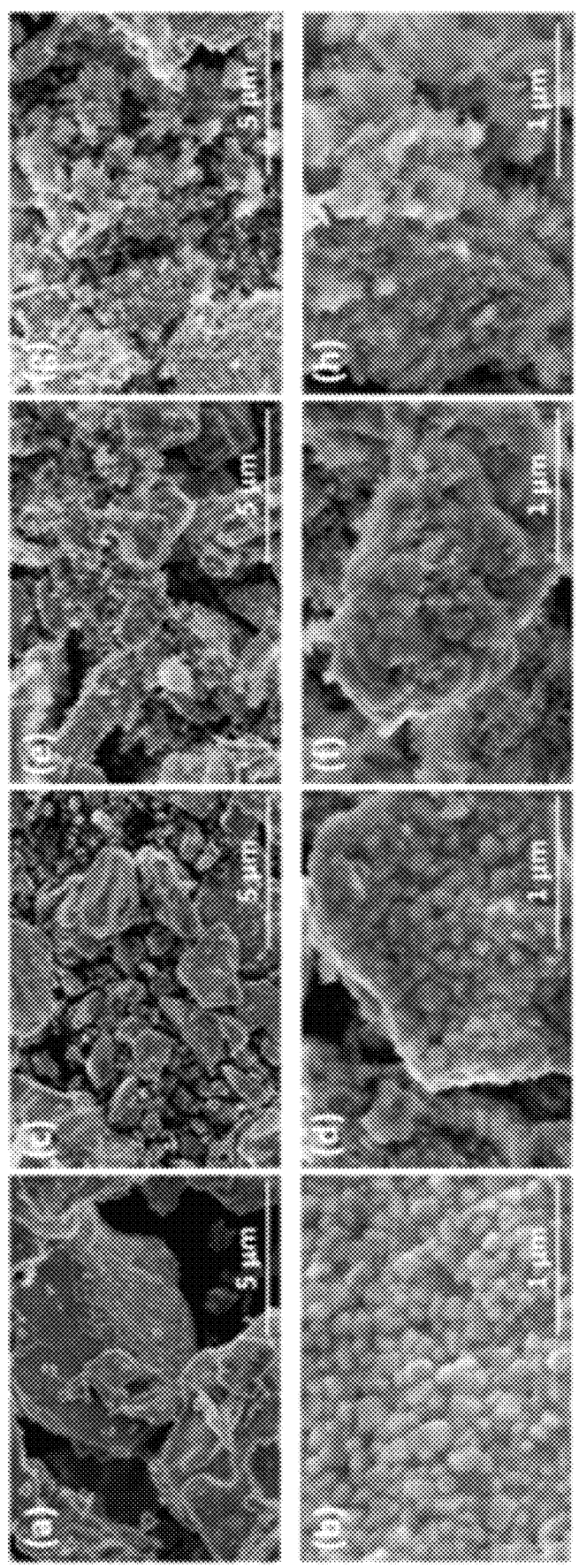
FIG. 4 shows SEM images of surfaces of SNC+YWOx composite cathodes calcined in air at 800° C. for 2 h (x=0 wt %, 10 wt %, 20 wt %, and 40 wt %), where (a and b) x=0, (c and d) x=10, (e and f) x=20, and (g and h) x=40.

FIG. 3 and FIG. 4 show SEM images of composite cathode materials of SNC+ZWOx and SNC+YWOx in different mixing ratios after calcination, respectively. Areas (a) and (b) in FIG. 4 are topographic images of pure SNC, which is a smooth large-granular powder. It can be seen from FIG. 1 that, after ZWO is added, SNC and ZWO are well combined to form a powder with fine-grained morphology, and with the increase of a ZWO content, this granular powder occupies the total field of view, indicating that as the phase reaction proceeds, an amount of a second phase generated increases, and when the ZWO content increases to x=20 wt %, the second phase $SrWO_4$ is precipitated from the powder phase and distributed on the surface of the material in a flocculent form. In the experiment of combining SNC with YWO, a similar phenomenon can also be observed. However, compared with ZWO, the phase reaction between SNC and YWO is not so intense, such that a small number of $SrWO_4$ impurity particles are generated and distributed on the surface of the host material, and the uniform fine-grained powder is still dominant, and when the YWO content reaches x=40 wt %, the morphology does not change much, which further proves that the phase reaction of ZWO and YWO with the host material SNC will make a composite change from smooth particles to fine-grained structures, and the generated impurity phases are distributed on the surface of the host material. Due to the intense phase reaction, when the ZWO content increases, a large amount of impurities adhere to the surface of the material, which is rare in YWO composites.

TEC and TGA Analysis

Figure 5:
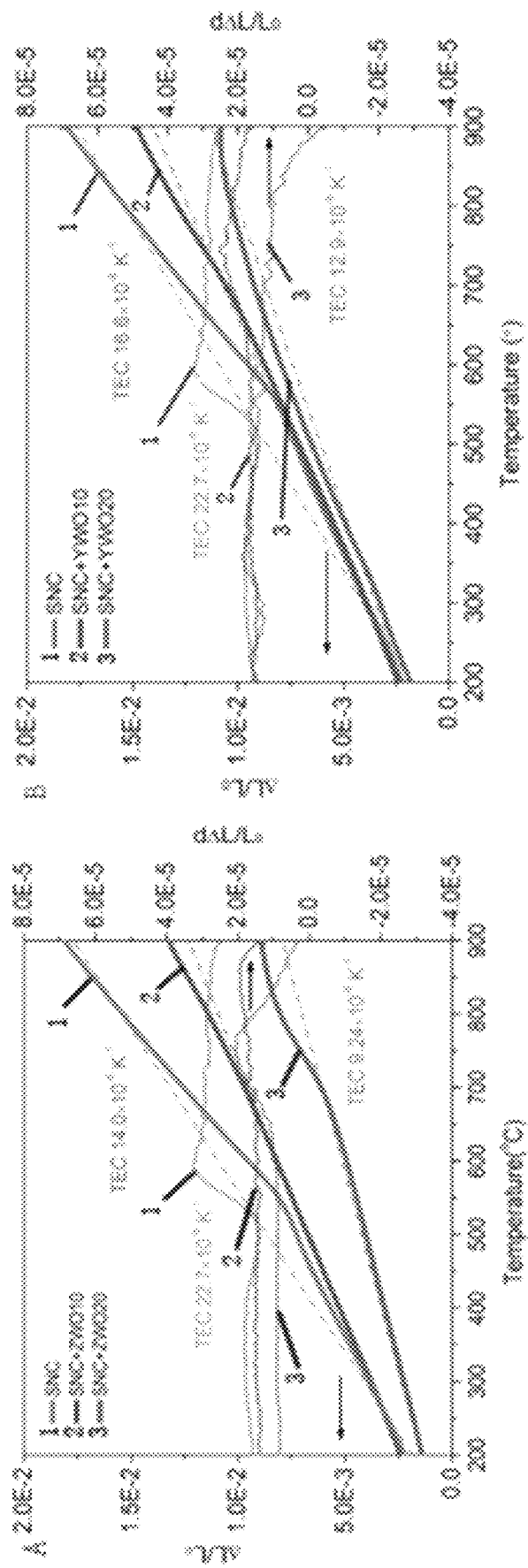
FIG. 5 shows thermal expansion curves of dense strip samples of SNC+ZWOx (x=0 wt %, 10 wt %, and 20 wt %)/SNC+YWOx (x=0 wt %, 10 wt %, and 20 wt %) in a temperature range of 200° C. to 900° C.

In order to study TECs of SNC+ZWOx and SNC+YWOx, 0.6 g of each of samples with x=0 wt %, 10 wt %, and 20 wt % is taken and pressed into a strip-shaped body, the body is calcined at 1,200° C. for 5 h to be densified, and then a TEC thereof is tested during a heating process from 200° C. to 900° C. in an air atmosphere. TEC test results of the SNC+ZWOx and SNC+YWOx are shown in FIG. 5. It can be observed from the curves in the figure that a TEC value of SNC is $22.7 \times 10^{-6}$ $K^{-1}$ in a temperature range of 200° C. to 900° C., and in the same temperature range and at the same combining ratio with the NTE material, an SNC+ZWO composite has a lower TEC value than an SNC+YWO composite, which is related to the low TEC value of ZWO itself (ZWO has a TEC of about $-9 \times 10^{-6}$ $K^{-1}$, and YWO has a TEC of about $-7 \times 10^{-6}$ $K^{-1}$). The occurrence of thermal expansion can be explained as the lattice expansion caused by reduction of $Co^{4+}$ into $Co^{3+}$ when a cathode is heated to an operating temperature of SOFC and reduction of $Co^{3+}$ into $Co^{2+}$ at a higher temperature. It can be seen from FIG. 5 that the TEC of SNC suddenly increases at 600° C., which is caused by the reduction of transition metal Co, and the introduction of ZWO alleviates this situation, when the temperature exceeds 600° C., the TEC of SNC+ZWO10 still shows a stable linear relationship with the temperature, but this rule is not applicable for SNC+ZWO20 in which the TEC value increases significantly after the temperature reaches 700° C. This may be because the intense phase reaction between ZWO and SNC observed above leads to the generation of $SrWO_4$ and changes the host structure and material morphology. In addition, it can be known that SNC+ZWO10 and SNC+ZWO20 respectively have TEC values of $14.0 \times 10^{-6}$ $K^{-1}$ and $9.24 \times 10^{-6}$ $K^{-1}$ in a temperature range of 200° C. to 900° C. In contrast to SNC+ZWOx, FIG. 5 shows test results of SNC+YWOx (x=0 wt %, 10 wt %, and 20 wt %), and it can be seen from curves in the figure that SNC+YWO10 and SNC+YWO20 respectively have TEC values of $16.6 \times 10^{-6}$ $K^{-1}$ and $12.9 \times 10^{-6}$ $K^{-1}$ in a temperature range of 200° C. to 900° C. Although a composite of YWO with SNC is weaker than ZWO in terms of TEC regulation, it is found that, when x=20, a TEC of SNC+YWO20 is almost the same as a TEC of an electrolyte material.

Figure 6:
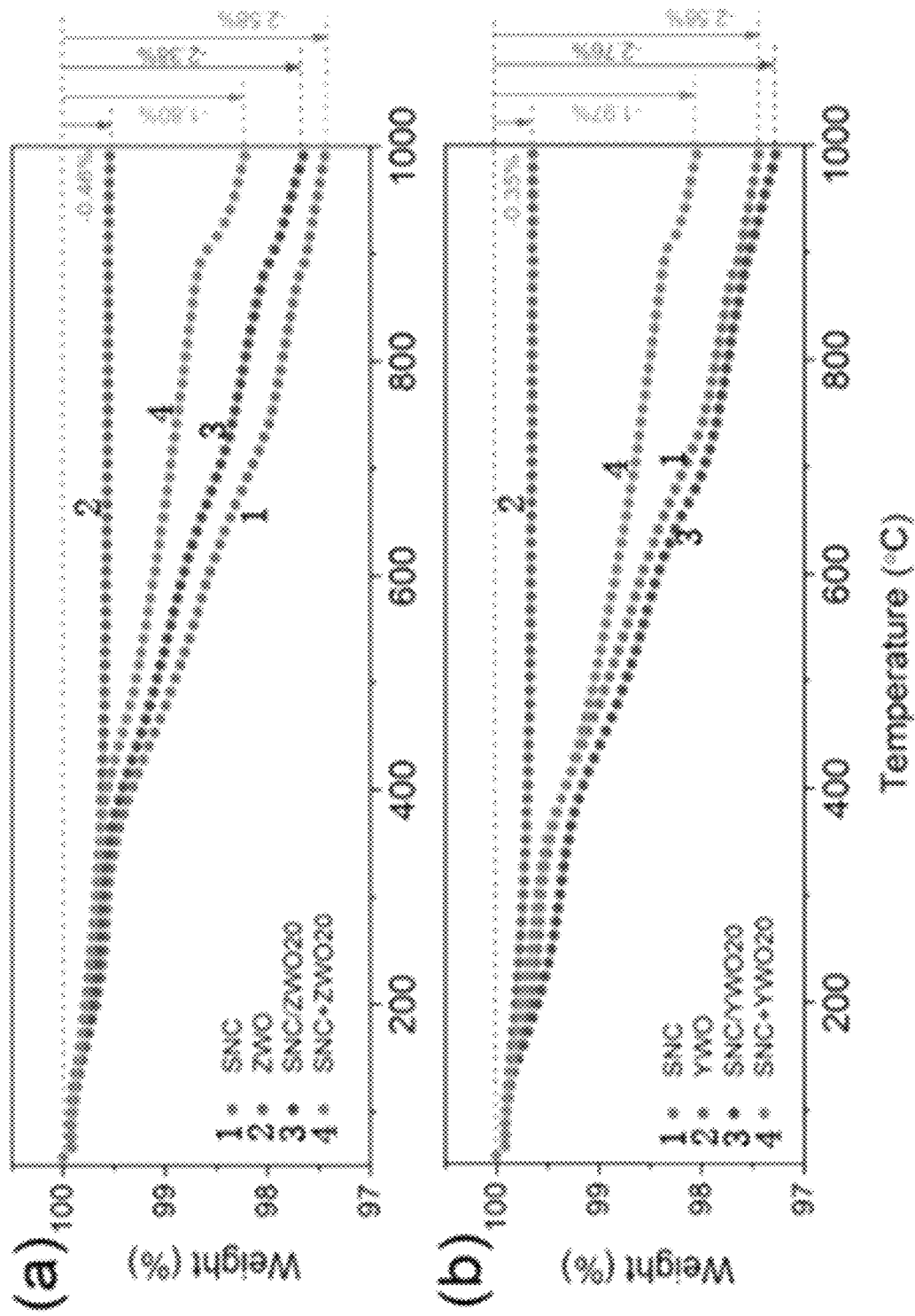
FIG. 6 shows thermogravimetric analysis (TGA) results, where (a) shows TGA curves of SNC, ZWO, SNC/ZWO20, and SNC+ZWO20 samples in air, and (b) shows TGA curves of SNC, YWO, SNC/YWO20, and SNC+YWO20 samples in air.

In order to further prove a change trend of thermal expansion, TGA is conducted by heating from RT to 1,000° C. in an air atmosphere, and results are shown in FIG. 6. In the figure, SNC/YWO20 is a mixture of SNC and YWO20 without calcination treatment, and the same is true for SNC/YWO20. It is found that ZWO and YWO respectively have weight losses of 0.46% and 0.35%, which do not change in a high temperature range, and thus the weight loss of ZWO and YWO has no impact on a composite. Moreover, it can be observed from FIG. 6 that the weight losses of SNC+ZWO20 is smaller than the weight losses of SNC and SNC/ZWO20, especially when the temperature is 500° C. or higher, and SNC+YWO20 also has a similar phenomenon, and the weight loss of SNC+ZWO20 is smaller than the weight loss of SNC+YWO20. The weight loss at a temperature higher than 400° C. should be attributed to the loss of lattice oxygen caused by the decrease of a valence state of Co, such as the reduction of $Co^{4+}$ into $Co^{3+}$ and $Co^{3+}$ into $Co^{2+}$, and thus the composite can inhibit the decrease of a valence state of Co in perovskite at a high temperature to inhibit the increase of TEC, which is also consistent with the change rule of thermal expansion mentioned above.

Electrochemical Resistance Analysis

In order to study the ORR catalytic activity of the composite cathode materials, an EIS test is conducted. Therefore, SNC+YWO20|SDC|SNC+YWO20 symmetric cells calcined at 800° C., 900° C., and 1,000° C. are first investigated under open-circuit conditions from 500° C. to 750° C. in air.

A preparation process of the symmetric cell is as follows: an electrode powder (c-SYNC or SNC) is mixed with isopropyl alcohol (IPA), ethylene glycol (EG), and glycerol to obtain a resulting mixture, the resulting mixture is subjected to ball-milling for 30 min to obtain an electrode slurry, then the slurry is sprayed on both sides of an SDC disc, and the resulting product is calcined at 800° C. for 2 h to obtain a symmetric cell. A thickness of the electrode is controlled by adjusting a spraying time.

Figure 7:
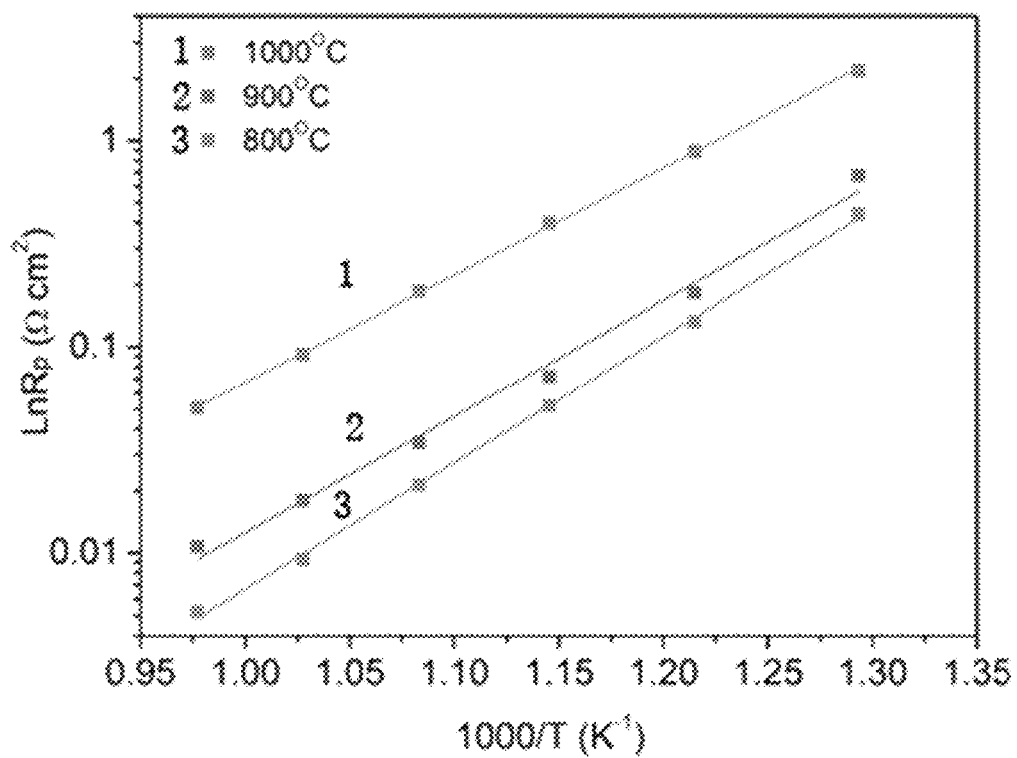
FIG. 7 shows ASR Arrhenius curves of SNC+YWO20 cathodes calcined at 800° C., 900° C., and 1,000° C.
Figure 8:
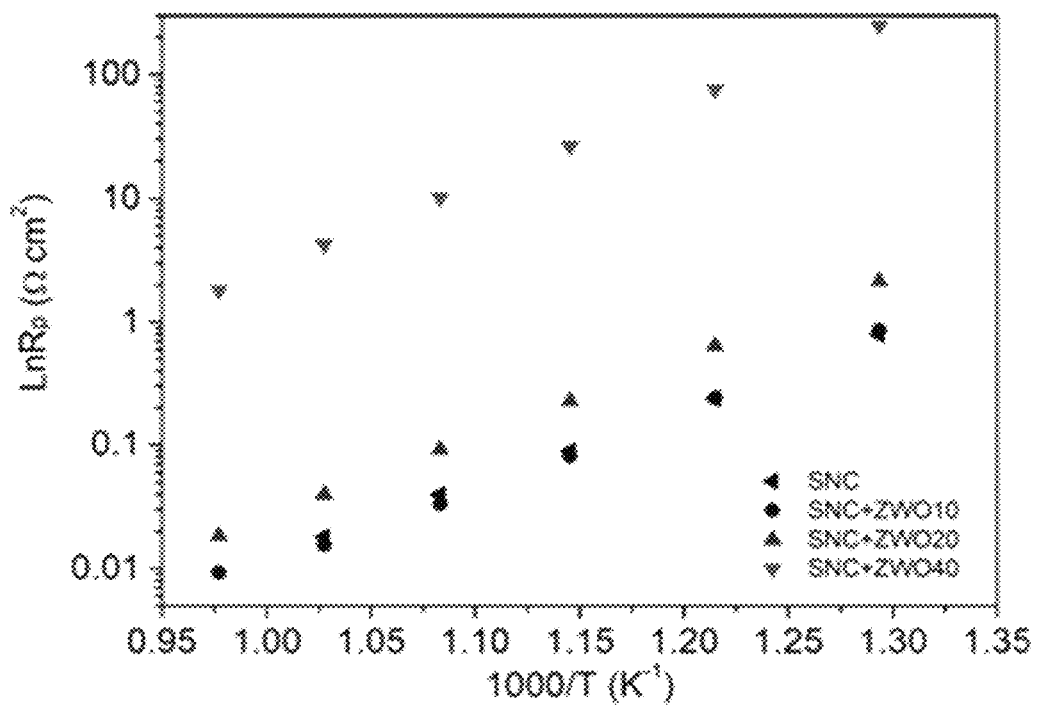
FIG. 8 shows Arrhenius curves illustrating ASR changes of SNC+ZWOx (x=10, 20, and 40) cathodes in a test temperature range of 500° C. to 750° C.

FIG. 7 shows Arrhenius curves of ASRs of SNC+YWO20 electrodes at different calcination temperatures, where Ea of samples calcined at 800° C. is much lower than Ea of samples calcined at 900° C. and 1,000° C. It indicates that a high calcination temperature will lead to low ORR activity, which is attributed to complex phase reactions occurring at 800° C. or above according to XRD results. Therefore, a calcination temperature of 800° C. is adopted to prepare all subsequent electrodes for further study.

Table 1 shows ASR values of several composites at different temperatures. Through resistance curves, the ASR values of components and relationships thereof with the temperature can be visually compared, and the smaller the resistance value, the higher the ORR electrical activity.

Table 1 shows ASR values of SNC+ZWOx (x=10, 20, and 40) and SNC+YWOx (x=10, 20, and 40) cathodes at 550° C. to 700° C.

ASR value of SNC+ZWO20 becomes 26.24 $\Omega cm^2$, which is more than 10 times the ASR value when x=20% and is greatly different from the original value, and this is because the unfavorable phase reactions between SNC and ZWO severely destroy the host structure and cause ORR catalytic activity decay.

Figure 9:
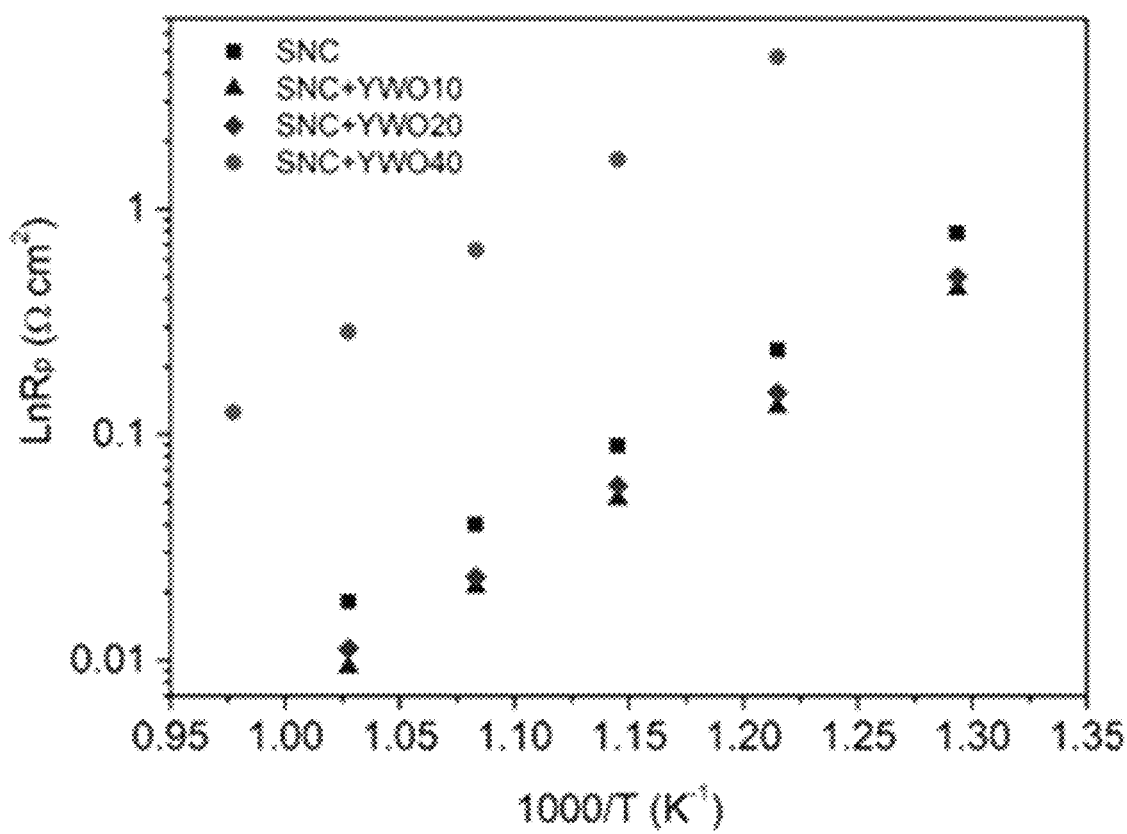
FIG. 9 shows Arrhenius curves illustrating ASR changes of SNC+YWOx (x=10, 20, and 40) cathodes in a test temperature range of 500° C. to 750° C.

In contrast to SNC+ZWOx, ASR curves of SNC+YWOx are shown in FIG. 9. When x=10 and x=20, corresponding SNC+YWO10 and SNC+YWO20 composite cathodes respectively have ASR values of 0.052 $\Omega cm^2$ and 0.059 $\Omega cm^2$ at 600° C. It is found through comparison that, after a predetermined amount of YWO is added, the ORR catalytic activity of the composite SNC+YWOx is significantly reduced compared with the original SNC, indicating that the phase reaction between the two does not hinder the oxygen reduction catalytic process of the composite, but promotes the process, and this may be because the phase reaction changes the phase structure of the SNC host material. When the YWO content continues to increase and reaches x=40, the ASR value of SNC+YWO40 becomes 1.66 $\Omega cm^2$, which is also much larger than the original value, indicating that the $SrWO_4$ impurity generated by the phase reaction observed also hinders the oxygen reduction catalytic reaction of the cathode to some extent.

Figure 10:
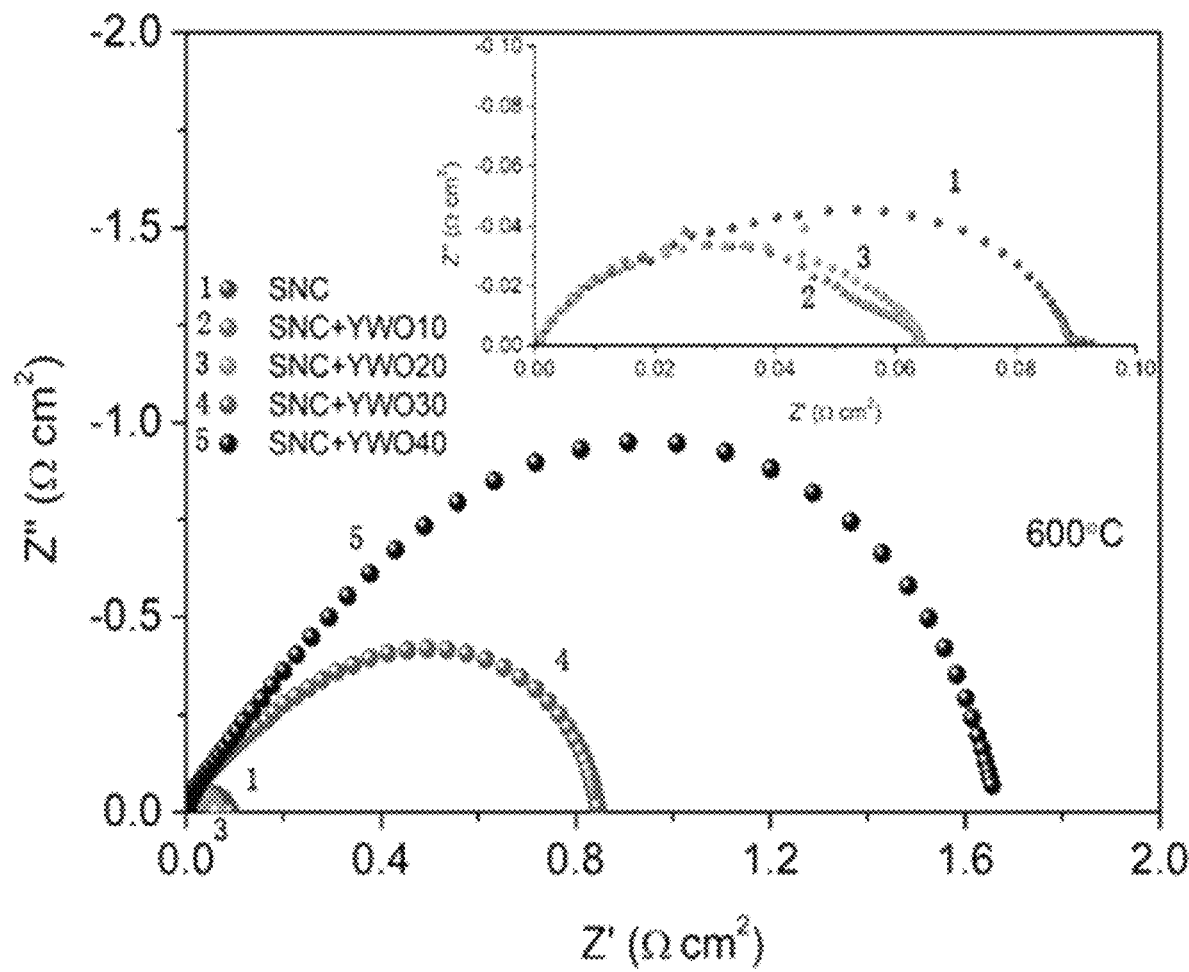
FIG. 10 shows electrochemical impedance spectroscopy (EIS) spectra of SNC+YWOx (x=0, 10, 20, 30, and 40) composite electrode-based symmetric cells at 600° C., where the inset graph shows EIS spectra for x=0, 10, and 20, and the effect of ohmic resistance has been removed.

In order to further analyze the change of the ORR catalytic activity of SNC+YWOx with the increase of the YWO proportion, the EIS spectra of SNC+YWOx symmetric cells at 600° C. are analyzed, as shown in FIG. 10. In the EIS spectra, an intersection of a high frequency (HF) band and a real axis reflects an ohmic resistance of an electrode, which generally represents a contact surface between the electrode and an electrolyte and an ohmic resistance generated in the electrolyte. An intercept of an HF band and a low frequency (LF) band on the real axis is a polarization resistance of an electrode, that is, the ASR mentioned above, where the HF band represents a charge transfer process of the electrode, and the LF band represents a resistance generated by a surface diffusion process of oxygen. It can be seen from the figure that, with x=20 as a critical value, when x is less than or equal to 20, SNC+YWOx can form a composite conducive to ORR activity, which can further reduce the electrochemical resistance value and improve the catalytic activity on the basis of excellent ORR of SNC; and when x is larger than 20, the resistance value of SNC+YWOx increases greatly, and a specific cause for this phenomenon needs to be determined from different rate control steps of the catalytic process. It can be simply

| Temperature/° C. | SNC | SNC + ZWOx | | | SNC + YWOx | | |
|---|---|---|---|---|---|---|---|
| | | x = 10 | x = 20 | x = 40 | x = 10 | x = 20 | x = 40 |
| 700 | 0.018 | 0.016 | 0.040 | 4.239 | 0.009 | 0.011 | 0.286 |
| 650 | 0.040 | 0.033 | 0.092 | 10.101 | 0.021 | 0.023 | 0.662 |
| 600 | 0.089 | 0.081 | 0.225 | 26.240 | 0.052 | 0.059 | 1.662 |
| 550 | 0.237 | 0.238 | 0.643 | 75.160 | 0.133 | 0.154 | 4.733 |
| 500 | 0.787 | 0.862 | 2.144 | 247.566 | 0.442 | 0.502 | 15.597 |

It can be seen from FIG. 7 that, taking the resistance at 600° C. as an example, the SNC host material has an ASR value of 0.09 $\Omega cm^2$, and after 10% ZWO is introduced into SNC, the ASR value becomes 0.08 $\Omega cm^2$, indicating that a small amount of ZWO will not change the ASR value significantly. As a proportion of ZWO continues to increase and reaches x=20%, the ASR value of SNC+ZWO20 increases to 0.23 $\Omega cm^2$, indicating a significant increase in resistance, and when the proportion increases to x=40%, the determined from FIG. 10 that, compared with the resistance value of SNC, the resistance values of SNC+YWO10 and SNC+YWO20 in the HF and LF bands are significantly reduced, and the resistance values in the LF band are reduced more, indicating that the composite products promote the bulk phase charge transfer process and the formed fine-grained structure greatly facilitates the surface diffusion process of oxygen. Moreover, the resistance values of SNC+YWO30 and SNC+YWO40 are significantly larger than that of other components, and it can be concluded through analysis that corresponding resistance values in HF and LF bands are increased. This may be because the severe phase reaction destroys the host perovskite component of the composite, and a large amount of impurities produced by the phase reaction are precipitated and attached to the surface, which greatly reduces the surface diffusion process of oxygen, thereby drastically weakening the ORR activity.

Impact of $CO_2$ on Electrochemical Resistance

Figure 11:
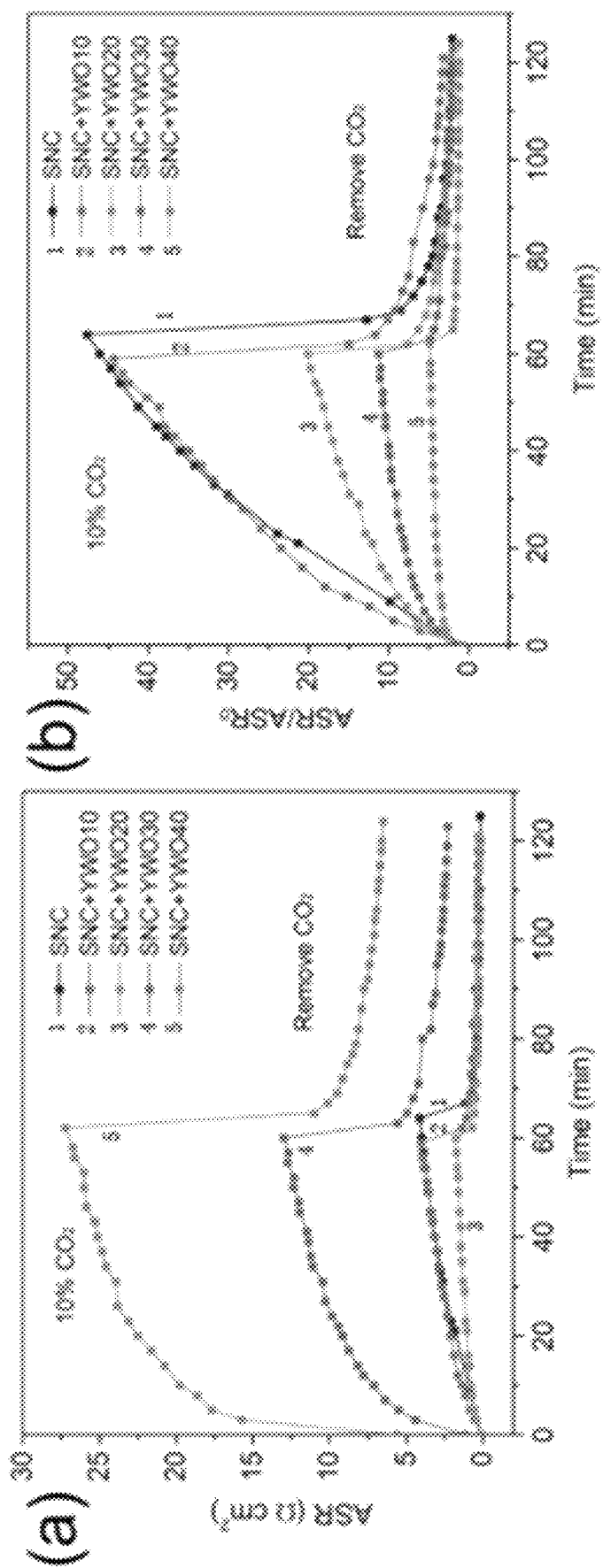
FIG. 11 shows ASR curves of cells, where (a) shows ASR values of SNC+YWOx symmetric cells at 120 min after the symmetric cells are placed under 10% $CO_2$ for 60 min at 600° C. and then $CO_2$ is removed; and (b) shows a relative change rate of an ASR value of each sample relative to initial ASR0.
Figure 12:
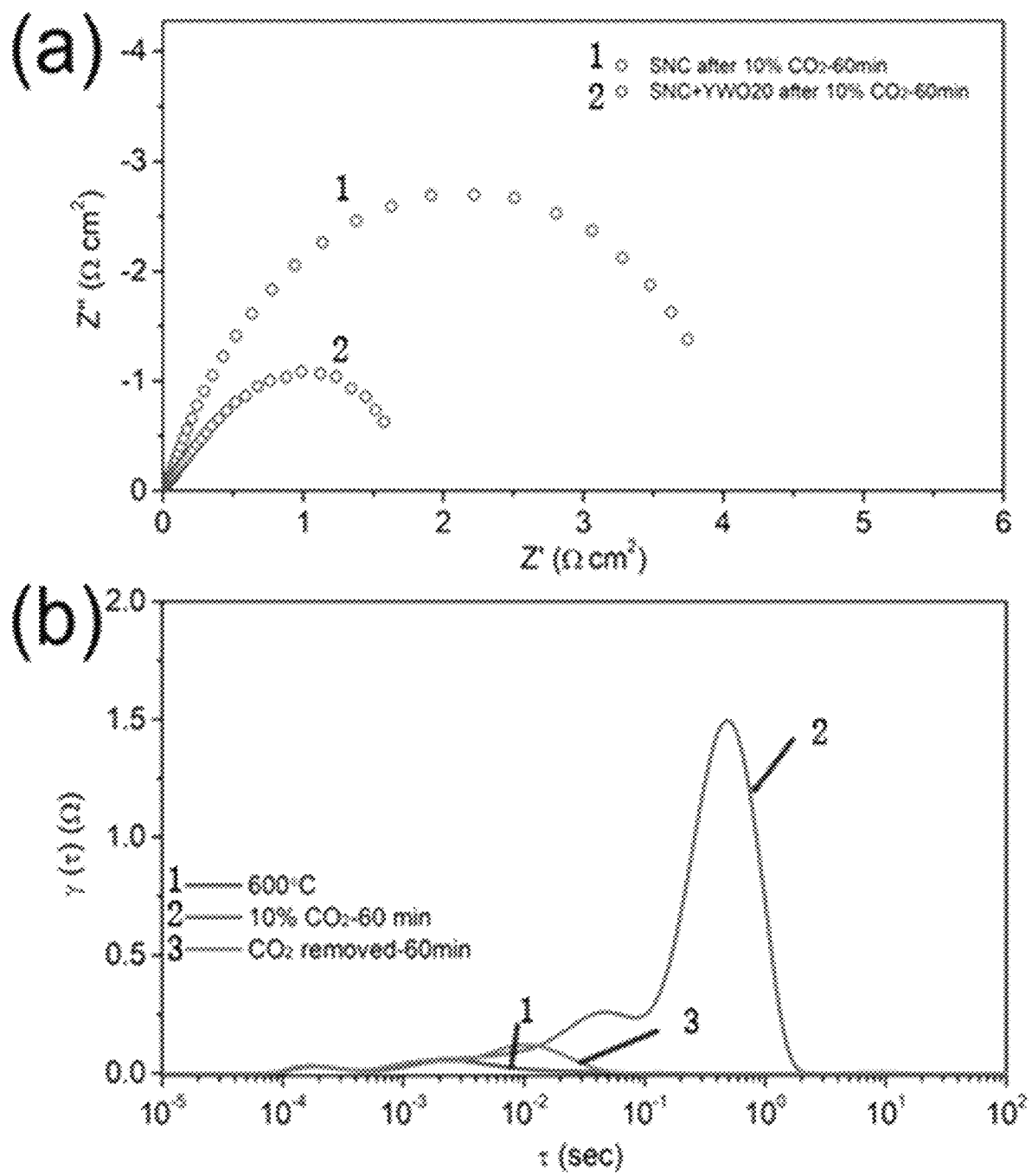
FIG. 12 shows EIS analysis of cells, where (a) shows EIS spectra of SNC+YWO20 and SNC after 60 min of carbon dioxide treatment; and (b) shows distribution of relaxation times (DRT) analysis of the EIS spectra of SNC+YWO20 before and after 60 min of $CO_2$ treatment.

Many SOFC cathodes with high activity are susceptible to $CO_2$ poisoning. Therefore, a $CO_2$ poisoning test is conducted at 600° C., and then EIS is used to evaluate the tolerance of the SNC+YWOx (x=0, 10, 20, 30, and 40) cathodes in a $CO_2$-containing atmosphere. As shown in (a) of FIG. 11, at 600° C., SNC+YWOx (x=0, 10, 20, 30, and 40)-based symmetric cells are placed in air introduced with 10 vol. % $CO_2$, then the $CO_2$ is removed, and the ASR is continuously monitored for 120 min in the air. Since a too-high YWO concentration will greatly increase an ASR value of an SNC+YWOx composite, after $CO_2$ is introduced, a relative change rate of the ASR value relative to an initial value under the same conditions is calculated (as shown in (b) of FIG. 11). It can be clearly seen that, with the increase of a YWO content, the relative change rate of ASR gradually decreases under $CO_2$-containing test conditions, and this is because the tolerance of the cathode to $CO_2$ poisoning is improved due to the introduction of $SrWO_4$ and YWO covering the surface. As shown in (a) of FIG. 12, after 10 vol. % $CO_2$ is introduced at 600° C. and ASR is continuously monitored for 60 min, the ASR (about 1.75 $\Omega cm^2$) of SNC+YWO20 is less than half of the resistance of the SNC cathode (about 4.13 $\Omega cm^2$). A corresponding ASR growth rate of the SNC+YWO20 cathode is 0.028 $\Omega cm^2\ min^{-1}$, and a corresponding ASR growth rate of the SNC cathode is 0.067 $\Omega cm^2$ min-. It is generally believed that the mechanism of $CO_2$ poisoning is as follows: the competitive adsorption of $CO_2$ for active sites inhibits the surface migration process of oxygen that determines the ORR rate. Moreover, the evidence that the LF peak of SNC+YWO20 becomes larger after $CO_2$ treatment in (b) of FIG. 12 is obtained from the above results. Therefore, the prominent $CO_2$ tolerance observed in SNC+YWO20 can be attributed to the high acidity of the YWO additive and the coverage of $SrWO_4$ on the cathode surface. Therefore, the SNC+YWO20 composite will hinder $CO_2$ adsorption and protect SNC from $CO_2$ poisoning. In addition, after switching back to air, both samples can be recovered.

It can be seen from the above tests that a negative thermal expansion material is introduced into a perovskite oxide to prepare an SOFC cathode material. Two common isotropic NTE materials (ZWO and YWO) are selected and combined with SNC perovskite cathodes with high ORR activity and large TEC, and the phase structure, material morphology, thermal expansion change, and electrochemical resistance are investigated. (1) The phase reaction between ZWO and SNC is intenser than that between YWO and SNC, and with the increase of the NTE material content, the phase reaction intensifies in both the composite SNC+ZWOx and the composite SNC+YWOx, and substances such as $SrWO_4$ are generated. (2) The phase reaction of ZWO and YWO with SNC can make the surface morphology of the host material change from smooth particles to fine particles, and impurities such as $SrWO_4$ will be precipitated and attached to the surface of the material. (3) With the increase of the NTE content, the TEC value of the composite decreases significantly, and the effect of ZWO to reduce TEC becomes obvious. The TEC value of SNC+YWO20 is 9.24×$10^{-6}\ K^{-1}$, which is far lower than the TEC value of an electrolyte material; and the TEC value of the SNC+YWO20 composite is 12.9×$10^{-6}\ K^{-1}$, which is perfectly matched with the TEC value of SDC. (4) In an electrochemical resistance test, the resistance of SNC+ZWOx is high due to the phase reaction, and gradually increases with the increase of the ZWO proportion. The ASR values of SNC+YWO10 and SNC+YWO20 at 600° C. are 0.052 $\Omega cm^2$ and 0.059 $\Omega cm^2$, respectively, and the two corresponding HF and LF processes are favorable for ORR. (5) SNC+YWOx shows high ORR activity, large TEC, and prominent anti-$CO_2$ poisoning performance. After 10 vol. % $CO_2$ is introduced at 600° C. and ASR is continuously monitored for 60 min, an ASR value (about 1.75 $\Omega cm_2$) of SNC+YWO20 is less than half of a resistance value of the SNC cathode (about 4.13 $\Omega cm^2$).

Phase Structure Analysis

A $Y_2W_3O_{12}$ oxide (YWO) is adopted as an NTE candidate material and combined with a $SrNb_{0.1}Co_{0.9}O_{3-\delta}$ (SNC) cathode to offset a mismatched TEC value with perovskite. By calcining a physical mixture of SNC and YWO at a high temperature, an interfacial phase reaction occurs between SNC and YWO, and the phase structure among the host material SNC, the mixture of SNC and YWO, and the composite obtained by mixing SNC and YWO and calcining the resulting mixture at a high temperature is further explored. Due to the large difference in TEC between YWO and SNC, if the two phases are bonded through weak physical contact, the two phases can be easily debonded during a thermal cycling process. The chemical reaction between the two phases will enhance the bonding between the two phases, thus ensuring prominent mechanical integrity. The potential phase reaction between the two phases is investigated by calcining YWO and SNC.

Figure 13:
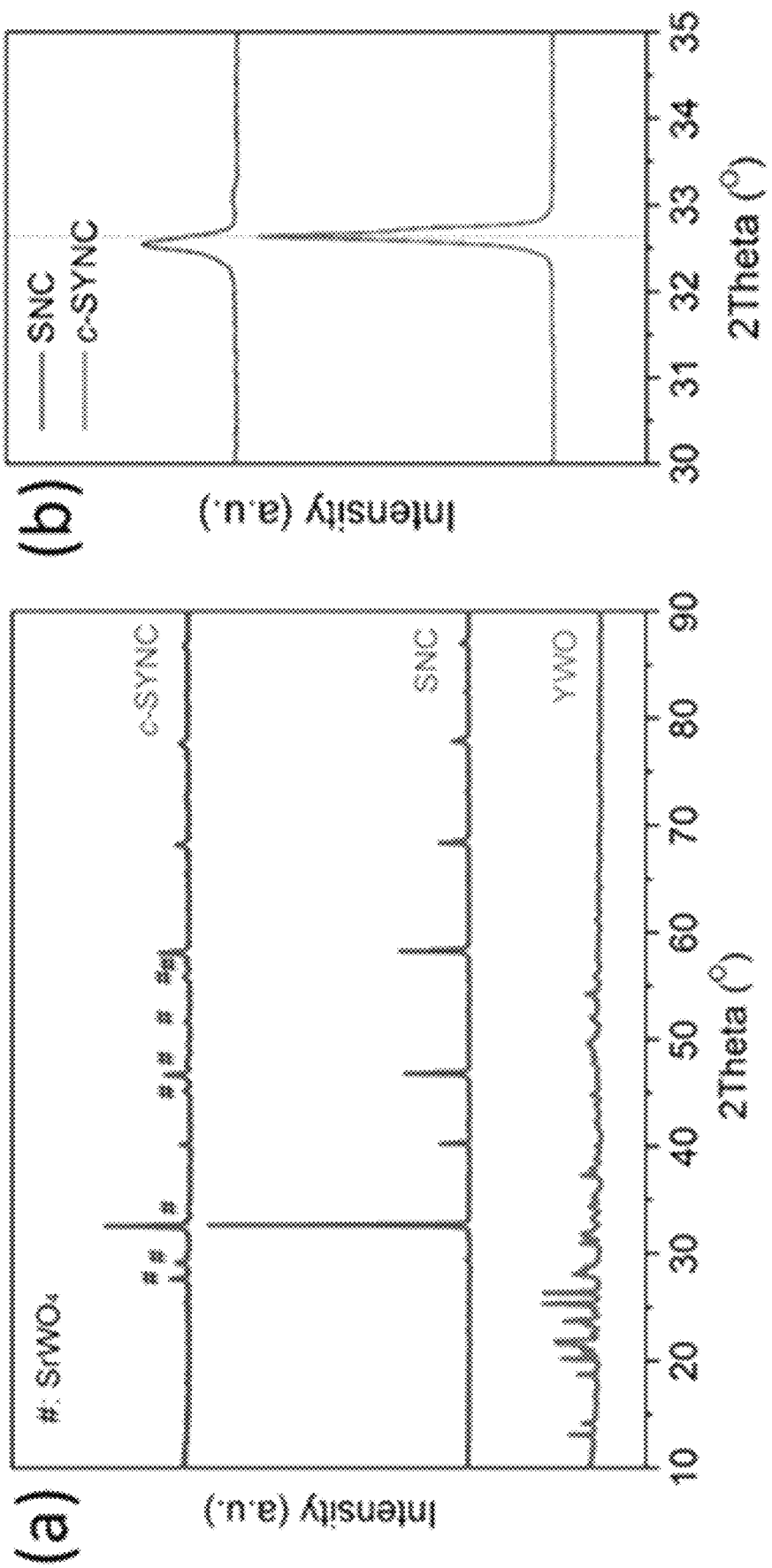
FIG. 13 shows results of phase structure analysis, where (a) shows XRD patterns of samples c-SYNC (red curve), SNC (blue curve), and YWO (gray curve) that are calcined at 800° C. for 2 h; and (b) shows enlarged parts of the XRD patterns of SNC and c-SYNC powders, with 2θ=300 to 35°.
Figure 14:
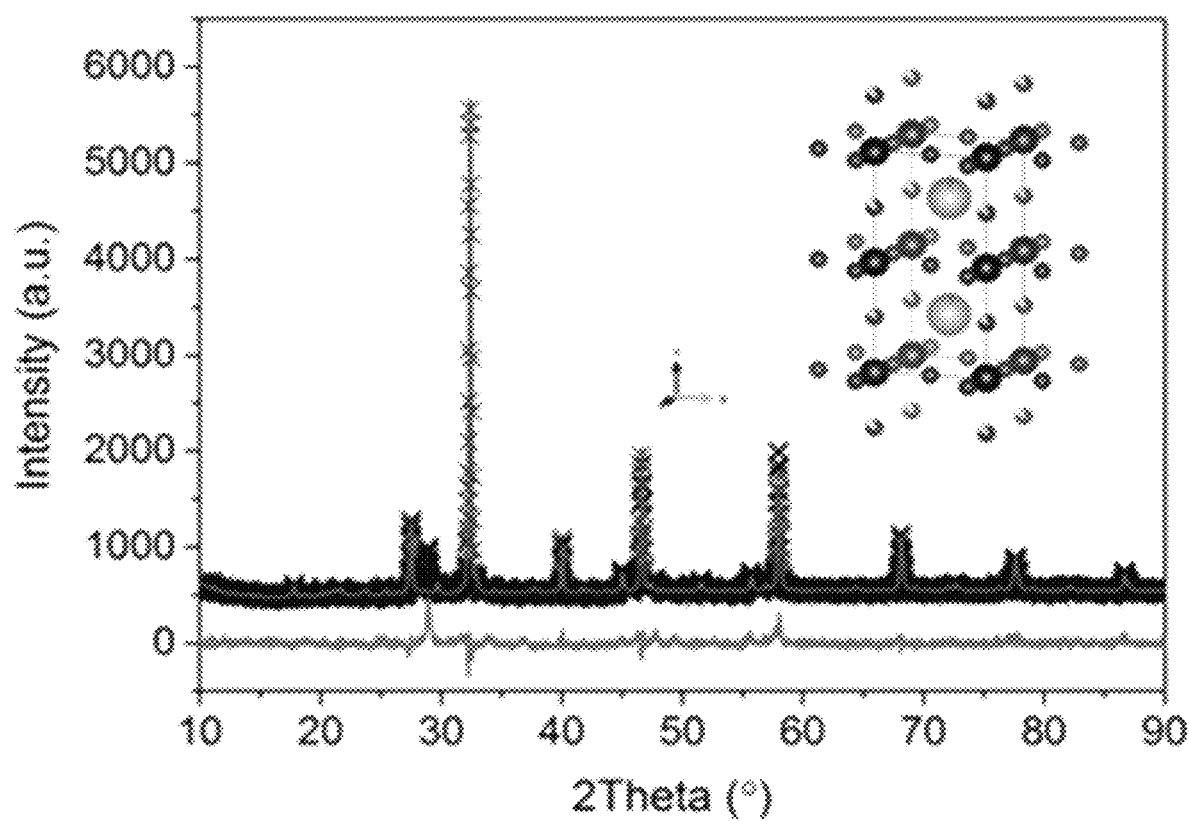
FIG. 14 shows Rietveld refinement results of a c-SYNC powder, including measured data and simulation and difference curves.

(a) of FIG. 13 shows XRD patterns of pure SNC, pure YWO, and a mixture of 20 wt % SNC and 80 wt % YWO (c-SYNC) subjected to thermal treatment at 800° C. for 2 h. After calcination, the formation of a second phase $SrWO_4$ is detected (JCPDF85-0587). It means that Sr precipitated from SNC can react with W in YWO to form $SrWO_4$, such that A-site cation deficiencies appear at the A-site of SNC perovskite in the composite. Through careful observation, it is found that a peak corresponding to the [110] crystal zone axis at about (2θ=33°) in the XRD pattern of the SNC phase (as shown in (b) of FIG. 13) indicates a shift to a low angle, indicating that the lattice volume expansion is due to the generation of cation deficiencies at the A-site in the perovskite lattice. Moreover, the SNC almost retains the original primary P4/mmm structure. $Sr_x(Nb_{0.1}Co_{0.9}Y_y)O_{3-\delta}$ (SYNC) can be formed in-situ by doping Y at the B-site during a thermal treatment process, and this conclusion can be supported by refinement results, as shown in FIG. 14. The refinement results show that the SNC has a P4/mmm space group, with a lattice size of a=b=3.8795 Å and c=7.7771 Å (detailed results of refinement are shown in Table 2). The above results confirm that Y with a large ionic radius is doped at the B-site of SNC, and a Sr precipitate causes deficiencies at the A-site, which in turn leads to lattice expansion. After the thermal treatment, the SNC/YWO mechanical mixture becomes a mixture of SYNC, YWO, and $SrWO_4$ newly formed, which is defined as c-SYNC.

Table 2 shows rietveld refinement data for c-SYNC powder.

| Rietveld refinement value | | | | |
|---|---|---|---|---|
| Rexp | Rwp | Rp | GOF | DW |
| 4.13 | 6.47 | 4.52 | 1.57 | 0.71 |

| Name | SYNC | YWO | SrWO$_4$ |
|---|---|---|---|
| Bragg radius | 3.594 | 3.404 | 2.295 |
| Space group | P4/mmm | Pnca | I41/a |
| Range | 0.000580004111 | 4.35759031E–007 | 7.83812735E-006 |
| Cell quality | 409.985 | 3685.421 | 1341.874 |
| Cell volume | 117.05189 | 1305.69679 | 349.53399 |
| Wt %-Rietveld | 82.822 | 6.239 | 10.939 |
| Crystallite size | | | |
| Lorentzian lattice size (nm) | 9685.7 | 78.0 | 111.8 |
| Strain | | | |
| Strain length | 0.1646415 | 0.3784114 | 0.1425521 |
| Crystal linear absorption coefficient (cm$^{-1}$) | 782.345 | 597.232 | 792.908 |
| Crystal density (g cm$^{-3}$) | 5.816 | 4.687 | 6.375 |
| Lattice parameter | | | |
| a | 3.8795299 | 10.0224150 | 5.4058441 |
| b | / | 13.4390213 | / |
| c | 7.7771452 | 9.6939844 | 11.9608591 |

Figure 15:
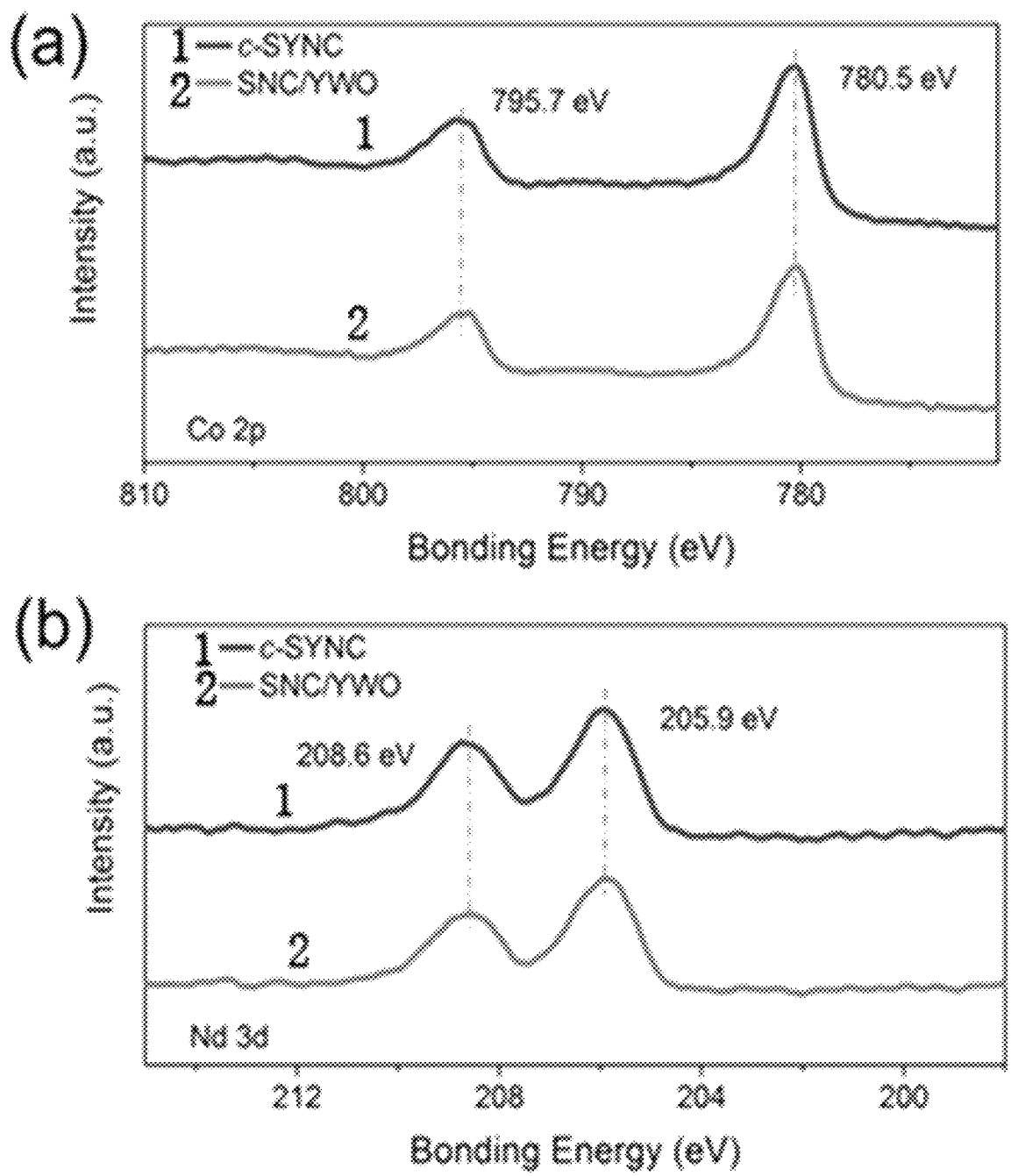
FIG. 15 shows X-ray photoelectron spectroscopy (XPS) spectra of (a) Co2p orbit and (b) Nb3d orbit of c-SYNC and SNC/YWO.

The A-site cation deficiencies and B-site low-valent dopants of SNC can introduce more oxygen vacancies, which are beneficial to the ORR. To elucidate the chemical state of the B-site element after Y doping, the valence states of Co and Nb in the c-SYNC sample and the valence states of precursors thereof (SNC/YWO, a mixture of SNC and YWO before thermal treatment) are subjected to comparative analysis according to XPS. It can be observed from (a) of FIG. 15 and (b) of FIG. 15 that SNC/YWO and c-SYNC have the same Co2p and Nb3d peak profiles, indicating that the chemical states of Co and Nb hardly change. Therefore, the substitution of Y$^{3+}$ will not affect the valence states of Co and Nb cations.

Figure 16:
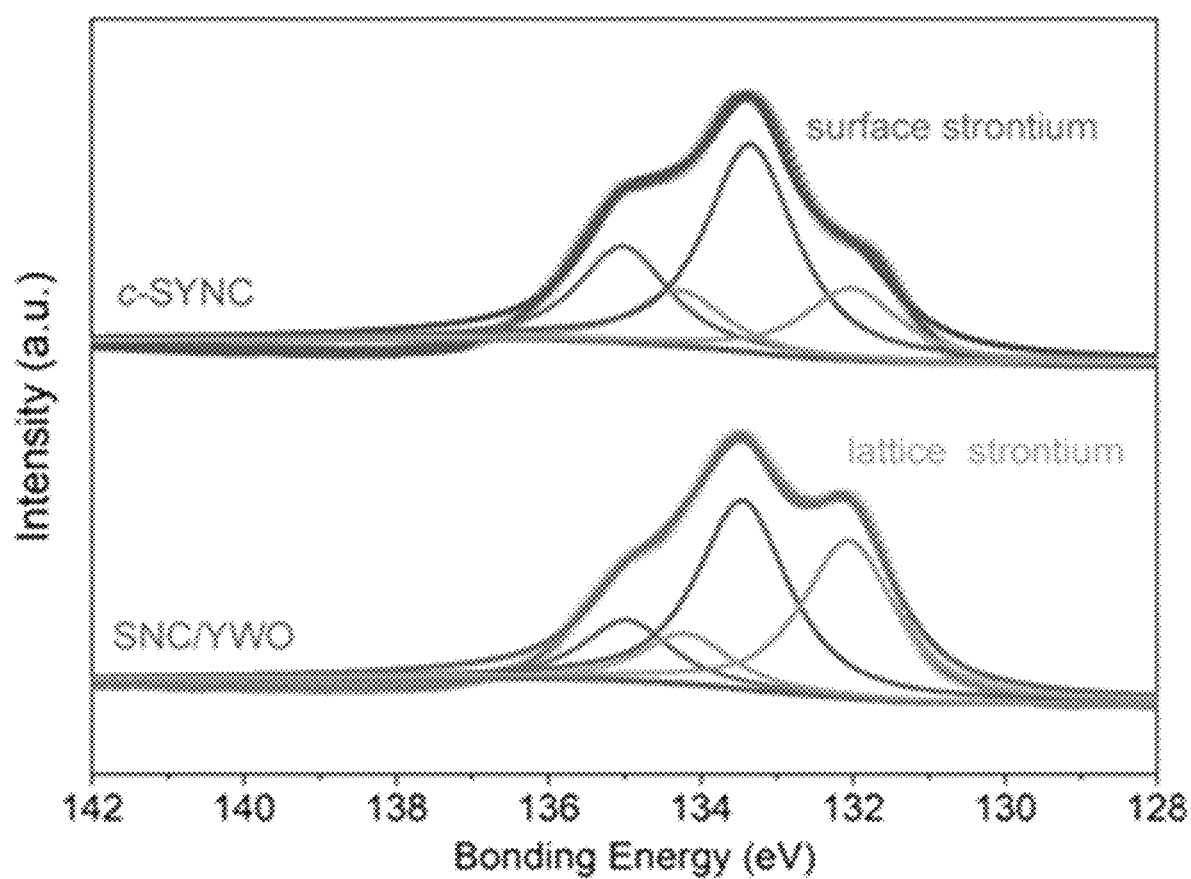
FIG. 16 shows XPS spectra of Sr3d orbit of c-SYNC and SNC/YWO.

An XPS spectrum of Sr 3d in the c-SYNC sample is shown in FIG. 16, and it can be seen from the figure that differentiated Sr 3d$_{5/2}$ and 3d$_{3/2}$ peaks correspond to two different kinds of Sr, namely, lattice Sr (low binding energy) and surface Sr (high binding energy). After calcination, a ratio of surface Sr to lattice Sr increases significantly. This increase can be attributed to the formation of surface SrWO$_4$, which is consistent with the XRD results.

Figure 17:
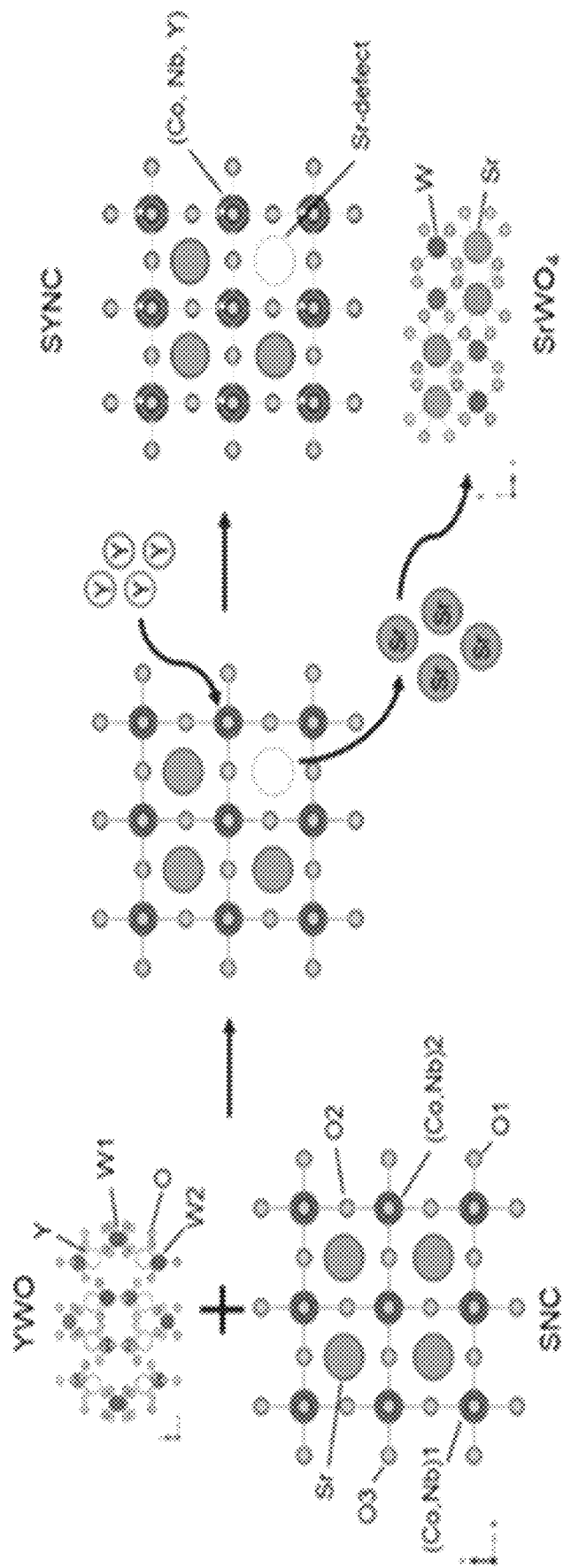
FIG. 17 is a schematic diagram of a c-SYNC cathode.

According to the above analysis, it can be inferred that a phase reaction will occur between SNC and YWO through a cation exchange mechanism at 800° C. As shown in FIG. 17, Sr cations at the A-site of SNC react with YWO to form SrWO$_4$ on the surface of the material, and then Y diffuses to the B-site of SNC to finally form a stable SYNC perovskite structure, which also includes some substances such as YWO and SrWO$_4$.

Figure 18:
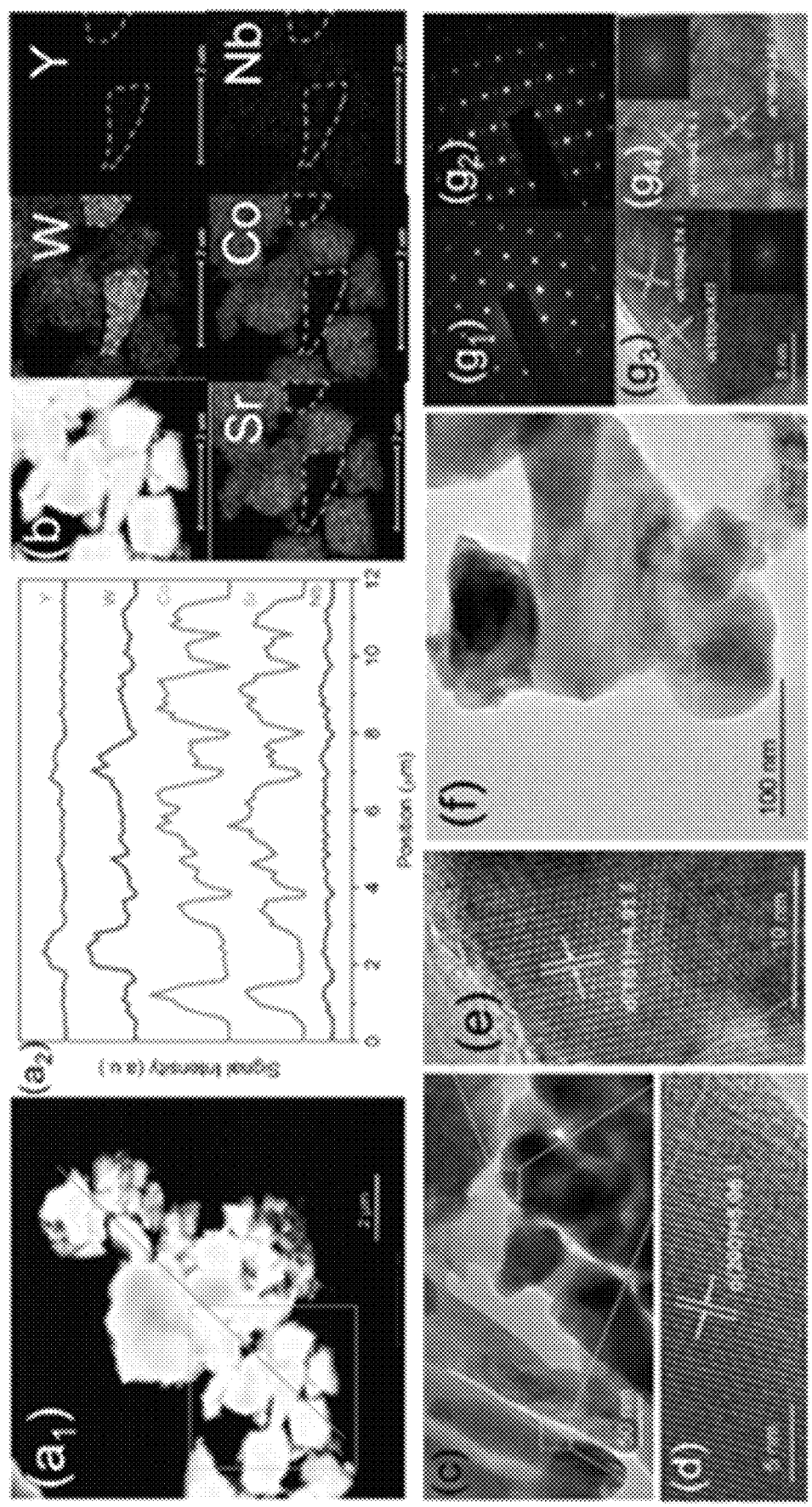
FIG. 18 shows a high-resolution transmission electron microscopy (HRTEM) image (a1) of a c-SYNC powder and an energy-dispersive X-ray spectrometry (EDS) spectrum (a2) of a corresponding component, a corresponding EDX spectrum (b) of the c-SYNC powder, and HRTEM and selected-area electron diffraction (SAED) images of the c-SYNC powder (c-g): where (c, f) show transmission electron microscopy (TEM) images of the c-SYNC powder, (d) shows an HRTEM image of YWO, (e) shows an HRTEM image of $SrWO_4$, and (g1-g4) show SEAD and HRTEM images of SYNC and fast Fourier transformation (FFT) plots corresponding to [101] space axis (g1, g3) and [110] space axis (g2, g4).

A crystal structure of c-SYNC can also be verified by HRTEM and EDS coupled with HRTEM (as shown in (a) of FIG. 18), where W and Y appear together with Sr, Nb, and Co at 7.5 μm. It reveals the existence of YWO and the strong combination of SYNC and YWO particles. From the element distribution analysis of selected areas ((b) of FIG. 18), Y and W are uniformly distributed in a particle area in which Sr, Co, and Nb are concentrated. The above results once again prove that SYNC and SrWO$_4$ are formed through surface cation exchange and cover the surface of SNC particles. SrWO$_4$ can be found from the image of a single c-SYNC composite particle in d of (c) of FIG. 18. The existence of YWO can also be confirmed by a lattice spacing d (200)=5.06 Å in (d) of FIG. 18. The 4.91 Å lattice spacing measured in the enlarged view ((e) of FIG. 18) corresponds to the [101] axis of SrWO$_4$. The existence of SYNC can be fully proved by the d (101)=3.47 Å and d (110)=2.74 Å lattice spacings observed in (f) of FIG. 18 and (g) of FIG. 18 and corresponding FFT and SAED.

Phase Stability and Thermal Stability Analysis

Figure 19:
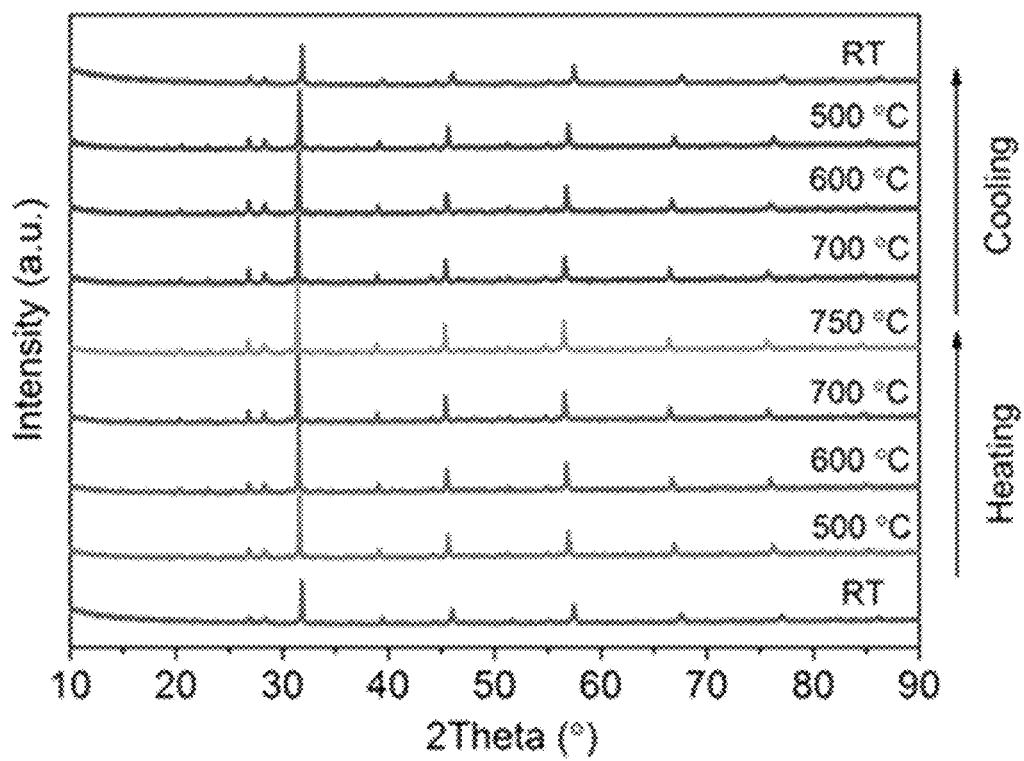
FIG. 19 shows high-temperature in-situ XRD patterns of a c-SYNC sample in air during a heating and cooling cycle from room temperature (RT) to 750° C.
Figure 20:
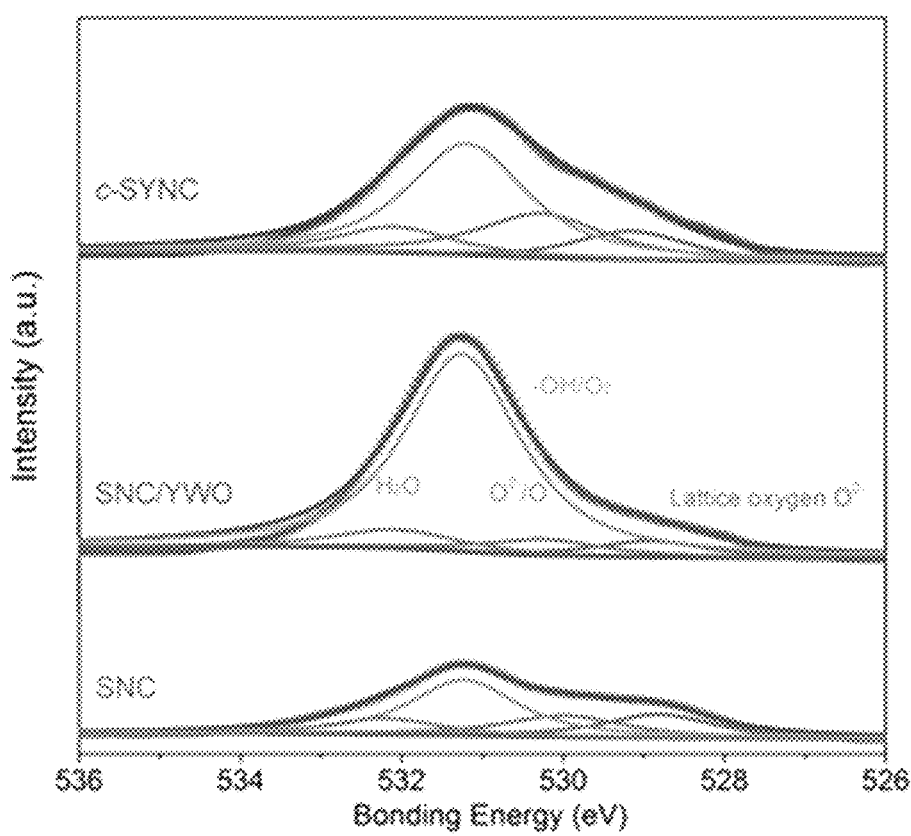
FIG. 20 shows O1sXPS curves of SNC, SNC/YWO, and c-SYNC powders.

Well chemical and thermal matching is very important for SOFC operation, especially for the tolerance of cathode materials. The crystal structure stability of the c-SYNC powder is first investigated by in-situ XRD characterization at RT to 750° C. (FIG. 19). The sample is kept at each temperature point for 5 h during a heating and cooling process, the phase structure of c-SYNC does not change, and no new phase is formed. Previously, XRD is conducted at RT after the SNC/YWO composite is calcined at 400° C. to 1,200° C. for 2 h, and it is found that SrWO$_4$ is formed in the c-SYNC composite at 800° C., and is converted into cubic Sr$_2$CoWO$_6$ at 1,000° C. or above (PDF #74-2470). Moreover, in the previous TGA results of c-SYNC, a weight loss of c-SYNC is smaller than weight losses of SNC and SNC/YWO, especially at 500° C. or above, which is attributed to the generation of A-site cation deficiencies in the c-SYNC perovskite that inhibits the reduction of Co valence in the perovskite at a high temperature. In addition, reactive oxygen species (ROS) (namely, highly-oxidative O$_2^{2-}$/O$^-$) may be formed on the surface of a catalyst. FIG. 20 shows XPS spectra of SNC, SNC/YWO, and SYNC at O 1s sequentially from bottom to top, where there are four distinct characteristic peaks, namely, lattice oxygen (O$^{2-}$) at about 529.0 eV, ROS (O$_2^{2-}$/O$^-$) at about 530.1 eV, hydroxyl/adsorbed surface oxygen (OH/O$_2$) at about 531.2 eV, and adsorbed H$_2$O molecules at about 532.1 eV. After YWO is introduced to form a composite, a proportion of —OH/O$_2$ first increases and then decreases during a calcination process to form c-SYNC. Moreover, a proportion of O$_2^{2-}$/O$^-$ in c-SYNC increases during calcination. Compared with the SNC powder, c-SYNC has a higher concentration of adsorbed oxygen ($O_{ad}$, including $O^{2-}$, $O^-$, and $OH$), as shown by an $O_{ad}/O_{lattice}$ ratio, and thus it can be concluded that c-SYNC has more oxygen vacancies on the surface.

Figure 21:
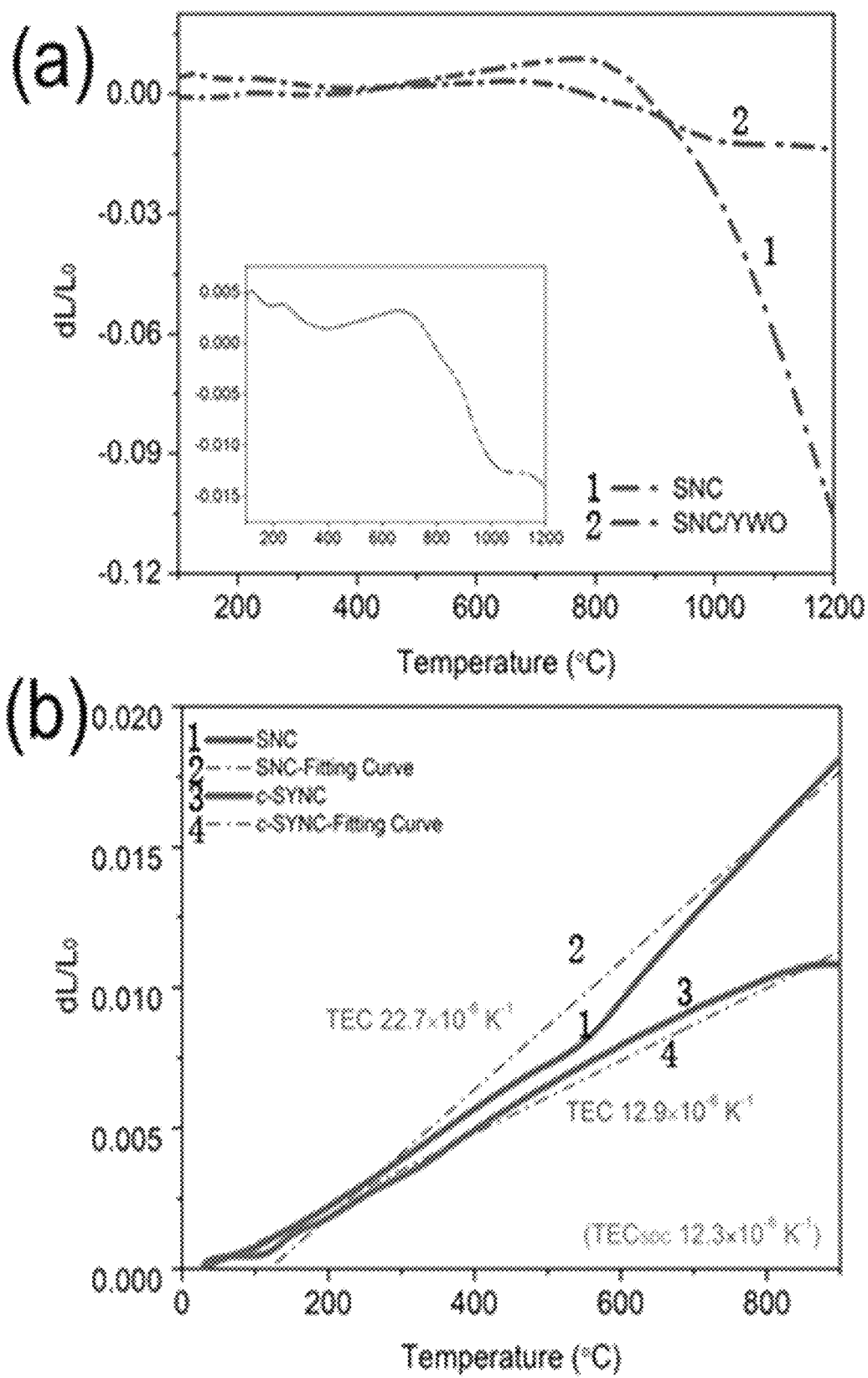
FIG. 21 shows thermal expansion curves, where (a) shows thermal expansion curves of uncalcined SNC and SNC/YWO strip samples in air from 100° C. to 1,200° C.; and (b) shows thermal expansion curves of SNC and c-SYNC dense strip samples from RT to 900° C.

TEC is a key characteristic of SOFC cathodes, which reflects the thermal stability of the cathode materials. A TEC of a cathode must be matched with a TEC of an electrolyte to reduce the risk of debonding between the cathode and the electrolyte during thermal cycling. In general, classical cobalt-based perovskite cathodes have high ORR activity, but show unsatisfactory thermal stability due to their high TEC values, such as $Ba_{0.5}Sr_{0.5}Co_{0.8}Fe_{0.2}O_3$ ($24 \times 10^{-6}$ $K^{-1}$) and $La_{0.6}Sr_{0.4}CoO_3$ ($21 \times 10^{-6}$ $K^{-1}$). This can be explained by the ionic radius expansion caused by the reduction of $Co^{4+}$ into $Co^{3+}$ and then the further reduction of $Co^{3+}$ into $Co^{2+}$ when the cathode is heated to an operating temperature of SOFC (usually above 500° C.). It is simple to lower TEC by mixing an NTE material with SOFC to improve the thermal stability. For the precursor SNC/YWO, thermal expansion curves from RT to 1,200° C. during a combining process of YWO with SNC are determined, which covers a temperature range of calcination, as shown in (a) of FIG. 21. It can be found that a volume shrinkage of SNC is much larger than a volume shrinkage of SNC/YWO, indicating that YWO can inhibit the shrinkage of SNC particles to alleviate the adverse effect of vigorous calcination of SNC. It should be noted that the shrinkage of SNC/YWO also increases to some extent when the temperature is higher than 800° C., which may be due to the reduction of a mass fraction of YWO caused by the phase reaction of YWO and SNC at 600° C. or above. After the calcination at 1,200° C., TEC curves of the prepared c-SYNC and SNC are measured once again, as shown in (b) of FIG. 21, and the same test is also conducted above. Results in different temperature ranges are summarized in Table 3. The reduction in TEC of c-SYNC measured at RT to 900° C. ($12.9 \times 10^{-6}$ $K^{-1}$) is perfectly matched with TEC of an SDC electrolyte ($12.3 \times 10^{-6}$ $K^{-1}$) and is much smaller than TEC of pure SNC ($22.7 \times 10^{-6}$ $K^{-1}$) and TEC of other cobalt-containing perovskite oxides. By comparing TECs measured at 550° C. to 900° C., TEC of c-SYNC is significantly lower than TEC of SNC ($10.8 \times 10^{-6}$ $K^{-1}$ and $26.5 \times 10^{-6}$ $K^{-1}$, respectively). This result is consistent with the reduction of $Co^{3+}$ into $Co^{2+}$ illustrated by TGA and the phase reaction between SNC and YWO at 600° C. or above demonstrated by XRD results. Therefore, it can be concluded that c-SYNC is a promising durable candidate cathode material, because this material enables a large reduction in TEC, especially at a typical operating temperature range of SOFC from 500° C. to 800° C.

Table 3 shows TEC values of SNC and c-SYNC samples in air.

|  | RT-900° C. | | RT-550° C. | | 550-900° C. | |
| --- | --- | --- | --- | --- | --- | --- |
|  | SNC | SYNC | SNC | SYNC | SNC | SYNC |
| TEC/$10^{-6}$ $K^{-1}$ | 22.7 | 12.9 | 16.0 | 14.4 | 26.5 | 10.8 |

Electrochemical Resistance Analysis

Figure 22:
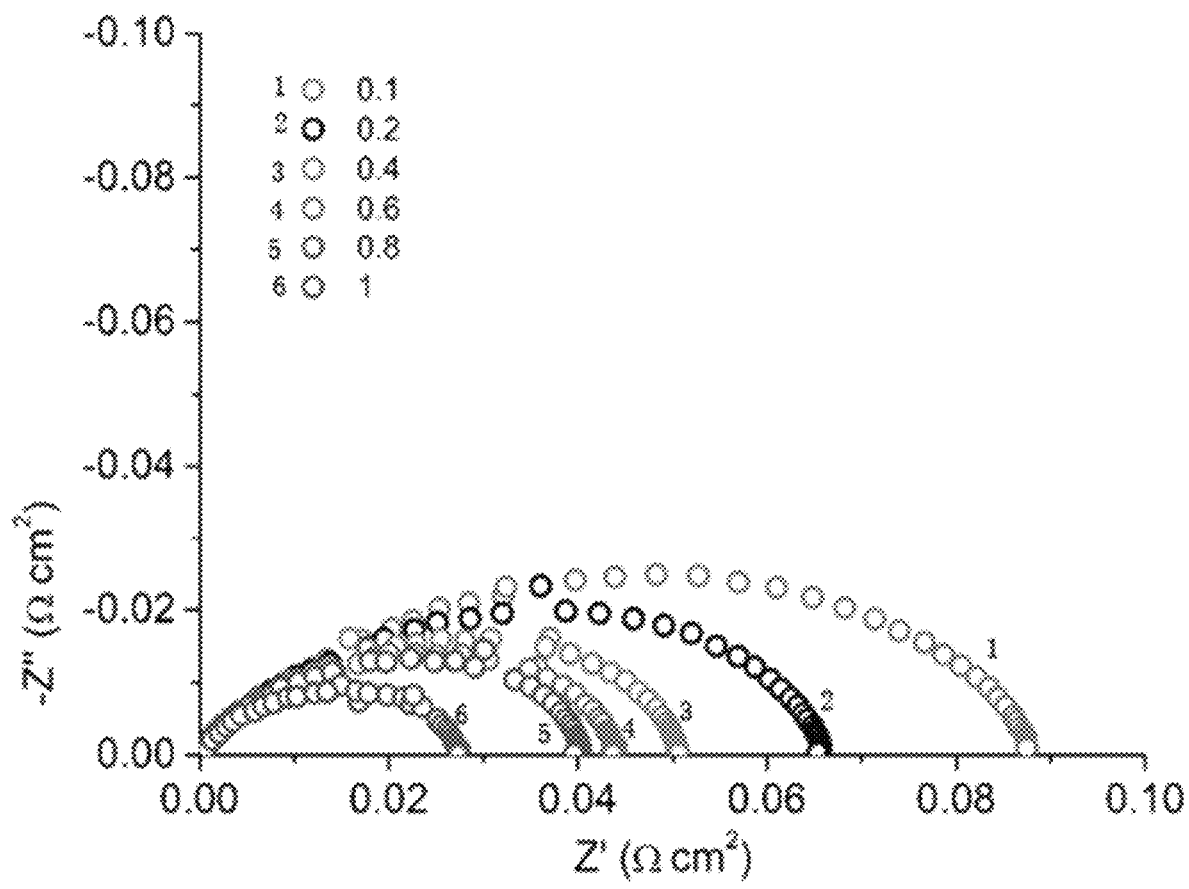
FIG. 22 shows EIS spectra of c-SYNC cathodes (calcined at 800° C.) with a partial oxygen pressure ($pO_2$) ranging from 0.1 atm to 1 atm at 600° C. using $N_2$ as an equilibrium gas.
Figure 23:
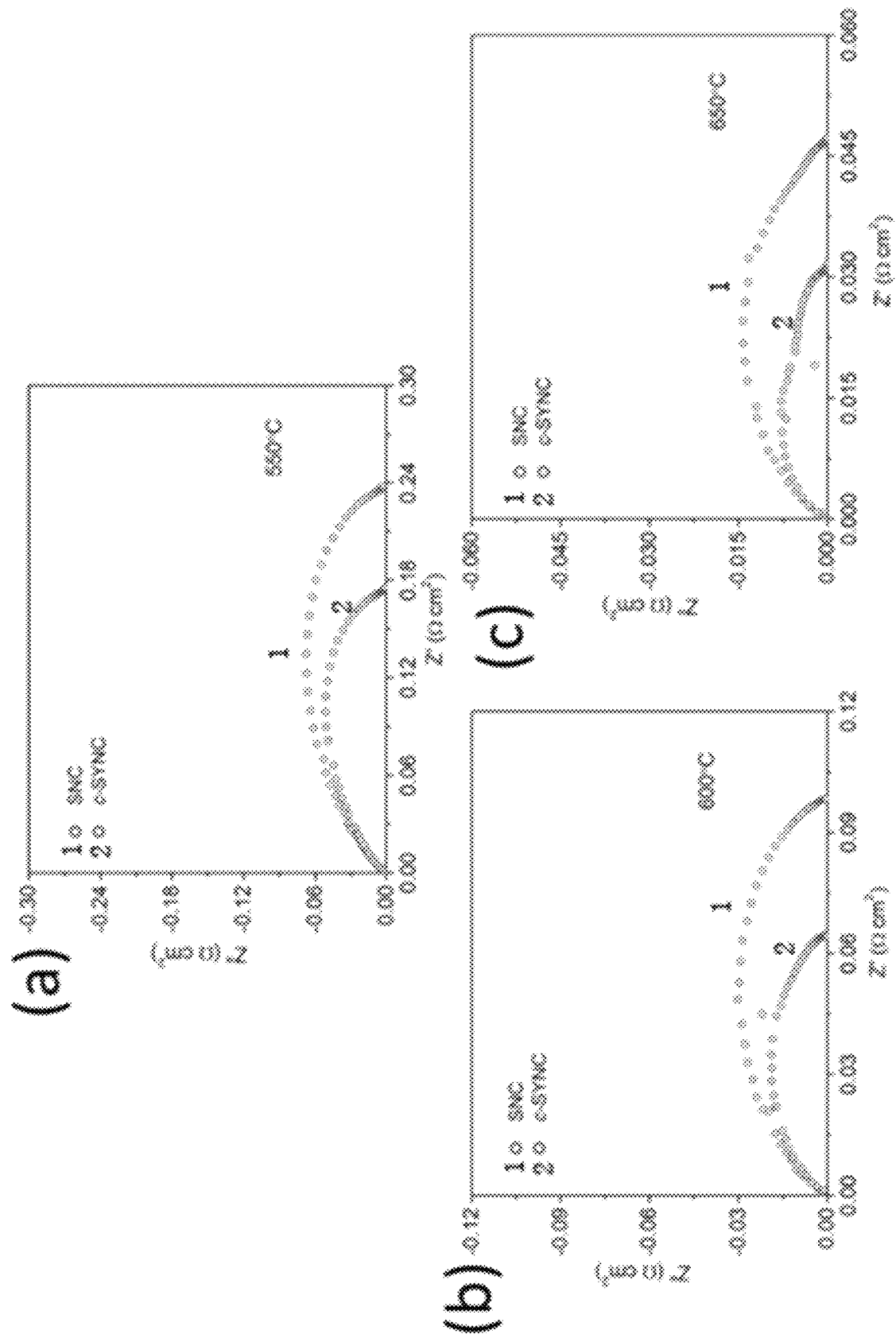
FIG. 23 shows EIS spectra of c-SYNC and SNC (calcined at 800° C.) at different temperatures 550° C. (a), 600° C. (b), and 650° C. (c).
Figure 24:
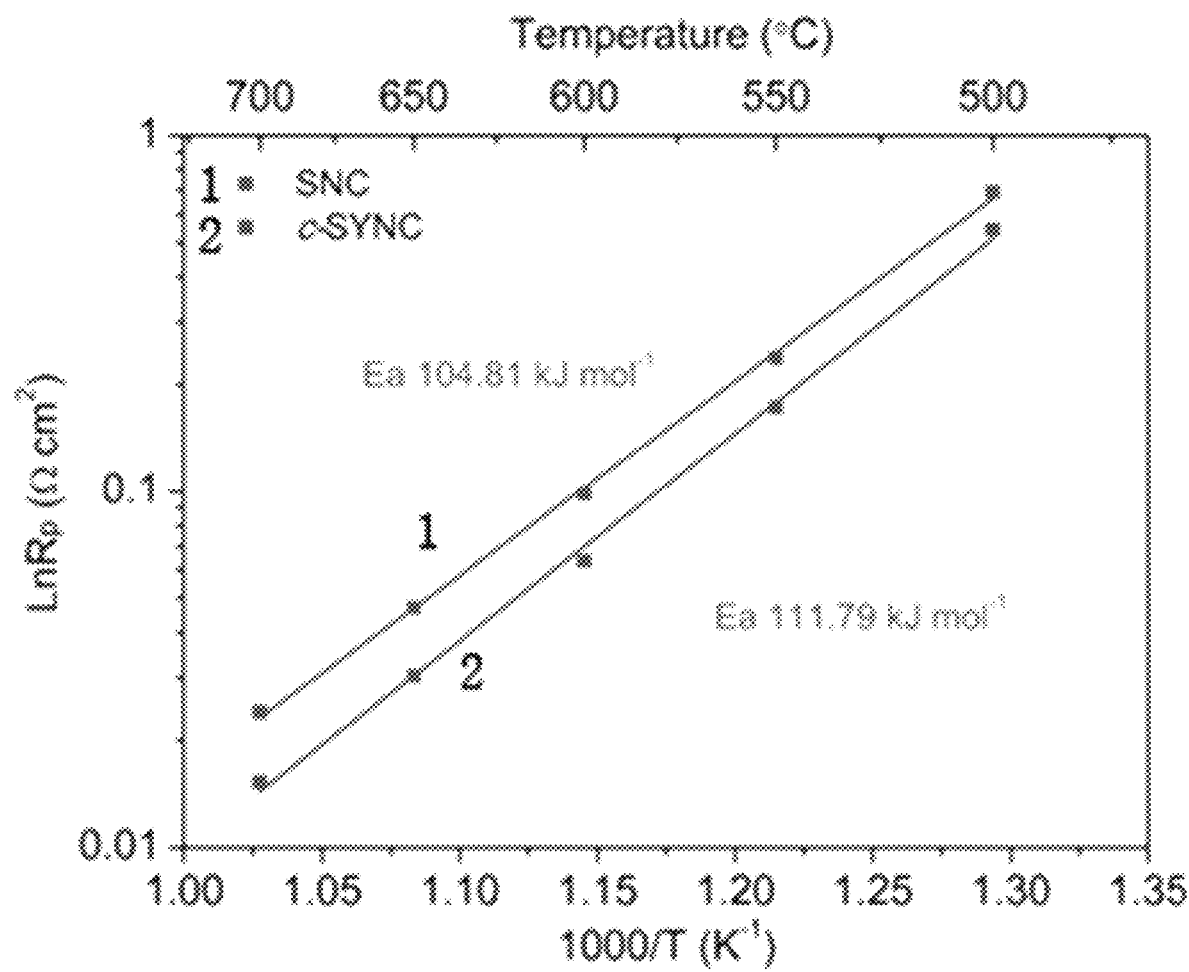
FIG. 24 shows Arrhenius curves of ASR of c-SYNC and SNC cathodes at different temperatures.

The ORR activity of a cathode can be reflected by ASR measured by a difference between two intercepts on the real axis in EIS. Therefore, c-SYNC|SDC|c-SYNC symmetric cells are investigated under open-circuit conditions from 500° C. to 750° C. in air. As mentioned above, the electrodes are all calcined at 800° C. The polarization resistance of c-SYNC electrodes is tested at different partial oxygen pressures, as shown in FIG. 22. At a high oxygen pressure, the total polarization resistance is low, for example, the ASR is 0.024 $\Omega cm^2$ at $pO_2$=1 atm; and the ASR is 0.084 $\Omega cm^2$ at $pO_2$=0.1 atm. As shown in FIG. 23 and FIG. 24, a total resistance of the c-SYNC cathode is also lower than a total resistance of the SNC cathode at 550° C. to 650° C. For example, the ASR value of c-SYNC at 600° C. is 0.063 $\Omega cm^2$, which is much lower than the ASR value of SNC (0.098 $\Omega cm^2$). Therefore, it can be concluded that YWO can be mixed with SNC to form an A-site deficient perovskite, which is favorable for the ORR activity. Furthermore, the surface coverage of the composite (rich in YWO and $SrWO_4$) has no impact on the ORR activity.

Figure 25:
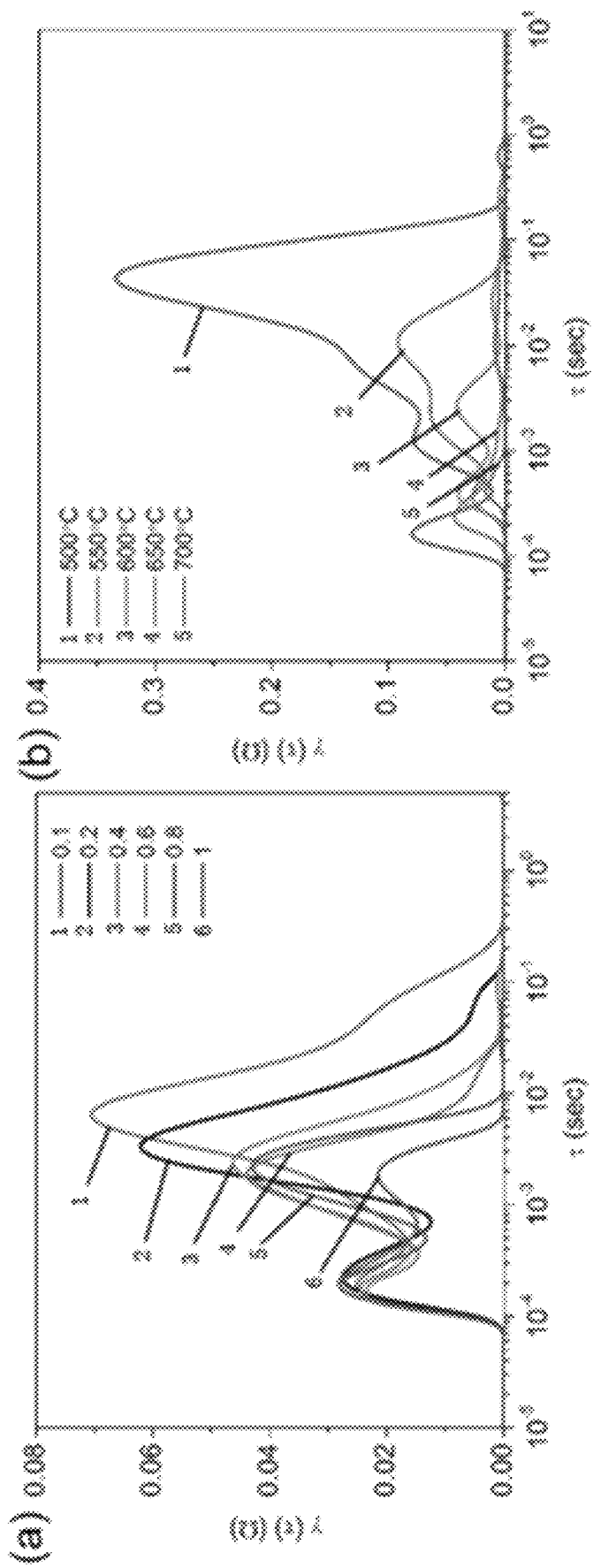
FIG. 25 shows DRT analysis of EIS results of c-SYNC samples at varying $pO_2$ (a) and at varying measurement temperatures (500° C. to 700° C.) (b).

DRT is used to determine rate-controlling steps of an electrode oxygen reduction process. (a) of FIG. 25 shows fitted curves at HF peak and LF peak, which are usually represented as an electron transfer process and an oxygen surface process, respectively. The change in $pO_2$ does not seem to affect the HF peak, but heavily affects the LF peak; and the LF peak shifts to an LF as $pO_2$ decreases. This means that, when the frequency of the LF peak is in a range of $10^1$ Hz to $10^2$ Hz, the adsorption/desorption and surface transport of surface oxygen are considered as rate-controlling steps. In addition, the decrease in temperature significantly increases the LF peak in (b) of FIG. 25, which can be attributed to the oxygen adsorption/desorption process.

Figure 26:
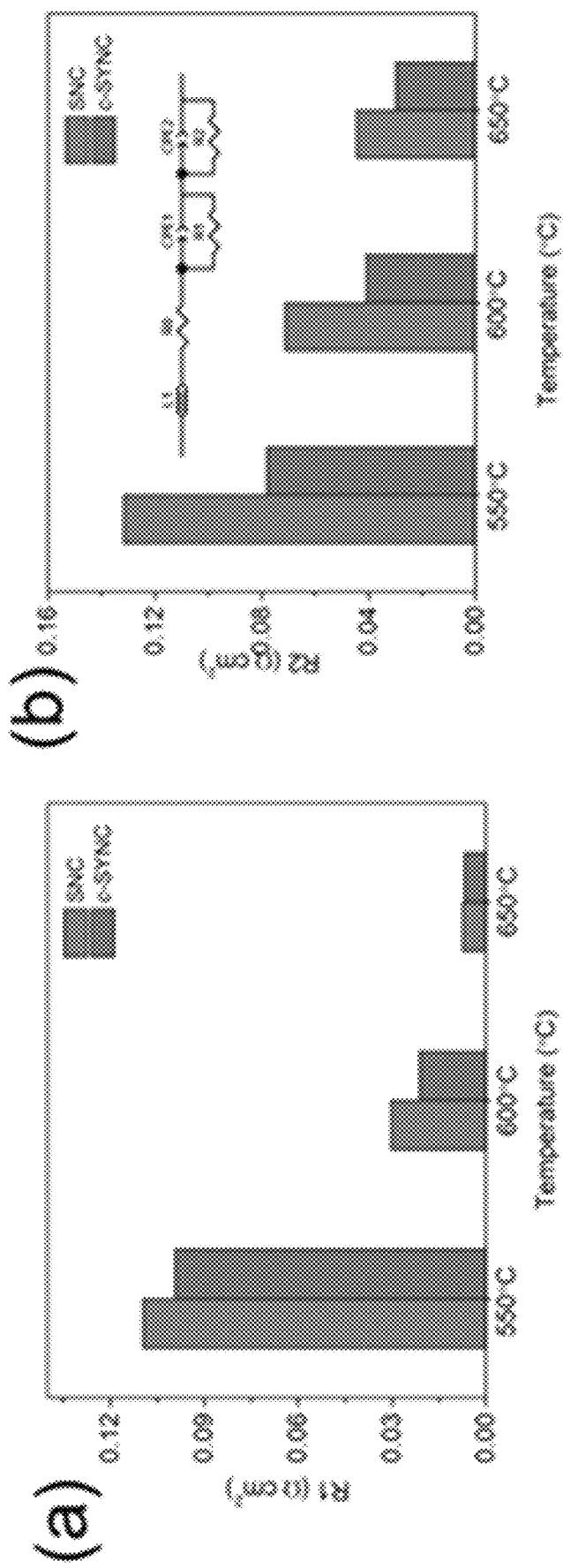
FIG. 26 shows R1 (a) and R2 (b) values of fitted EIS for c-SYNC and SNC samples at 550° C., 600° C., and 650° C., with an equivalent circuit diagram in the inset graph.

In addition, an equivalent circuit model with L1-$R_{ohm}$-(R1-CPE1)-(R2-CPE2) is proposed to fit the EIS spectrum. An inductive element L1 is related to an external circuit, and $R_{ohm}$ is mainly related to an ohmic resistance of a cell. R1 and R2 represent resistance values from HF and LF processes, respectively. (a) of FIG. 26 and (b) of FIG. 26 respectively show R1 and R2 fitting results of SNC and c-SYNC samples at 550° C., 600° C., and 650° C. It is found that a value of R2 is higher than a value of R1, indicating that the oxygen surface exchange may be a rate-controlling step in this case, which is perfectly consistent with the DRT analysis. Compared with SNC, large reductions in R1 and R2 are observed in the c-SYNC samples at different temperatures. These observations show that the introduction of YWO to form A-site deficiencies in the c-SYNC composite may be an efficient way to facilitate bulk electron transfer and surface oxygen processes.

Figure 27:
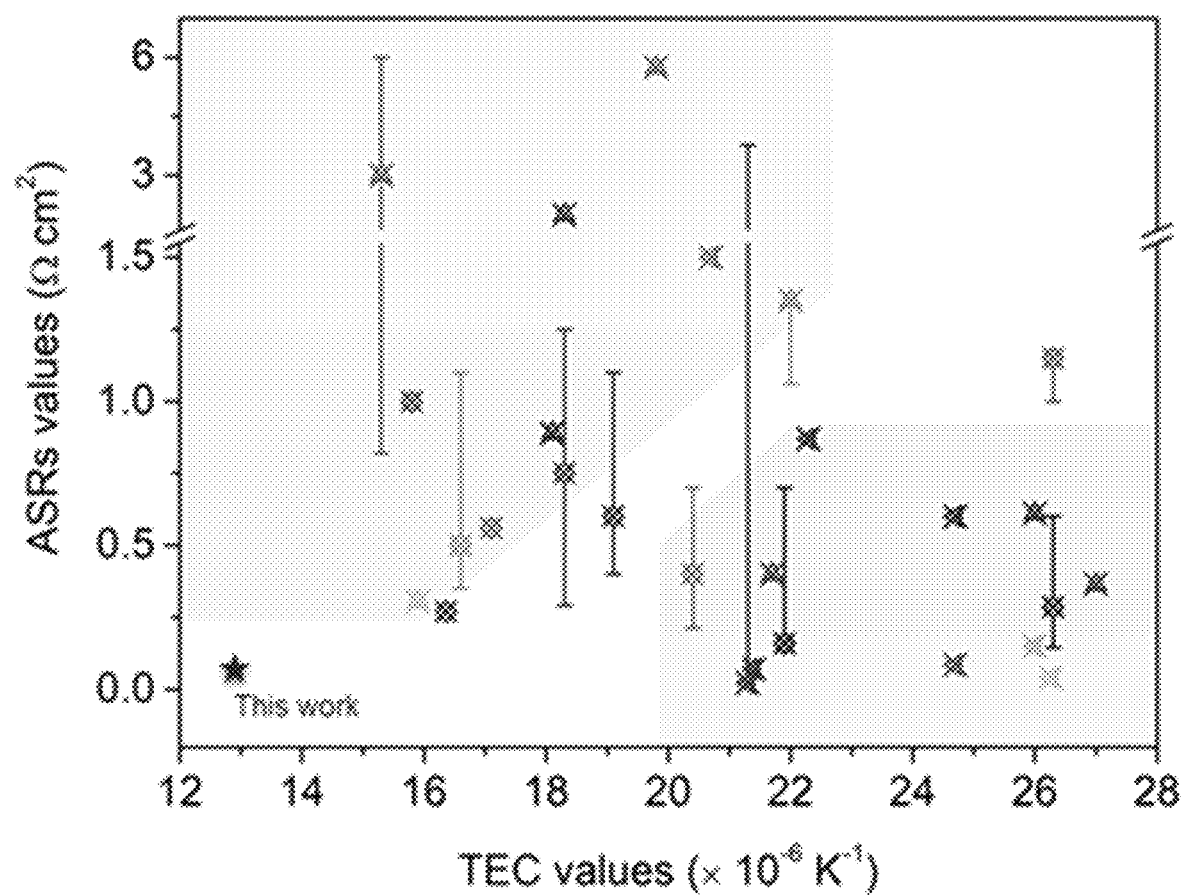
FIG. 27 shows the distribution of comparative TEC and ASR values of various excellent cathode materials at 600° C.

FIG. 27 shows the distribution of comparative TEC and ASR values of various excellent cathode materials at 600° C. The electrochemical resistance values (at 600° C.) and TEC values of various excellent SOFC cathodes with high ORR catalytic activity are summarized.

Specific reference materials may include: cobalt-rich materials: $Ba_{0.5}Sr_{0.5}Co_{0.8}Fe_{0.2}O_{3-\delta}$, $La_{0.4}Ba_{0.6}CoO_{3-\delta}$, $La_{0.3}Ba_{0.7}Co_{0.6}Fe_{0.4}O_{3-\delta}$, $La_{0.6}Sr_{0.4}CoO_{3-\delta}$, $La_{0.8}Sr_{0.2}Co_{0.8}Fe_{0.2}O_{3-\delta}$, $SrCo_{0.8}Nb_{0.1}Ta_{0.1}O_{3-\delta}$, $SrCo_{0.8}Fe_{0.2}O_{3-\delta}$, and $Sm_{0.5}Sr_{0.5}CoO_{3-\delta}$; iron-rich materials: $Ba_{0.5}Sr_{0.5}Co_{0.2}Fe_{0.8}O_{3-\delta}$, $La_{0.4}Sr_{0.6}Co_{0.2}Fe_{0.8}O_{3-\delta}$, $Sm_{0.6}Sr_{0.4}Fe_{0.8}Co_{0.3}O_{3-\delta}$, $Gd_{0.6}Sr_{0.4}Fe_{0.8}Co_{0.2}O_{3-\delta}$, $Ba_{0.5}Sr_{0.5}Zn_{0.2}Fe_{0.8}O_{3-\delta}$, $Ba_{0.5}Sr_{0.5}Cu_{0.2}Fe_{0.8}O_{3-\delta}$, $Sm_{0.5}Sr_{0.5}Cu_{0.2}Fe_{0.8}O_{3-\delta}$, $SrNb_{0.2}Fe_{0.8}O_{3-\delta}$, and $Sm_{0.5}Sr_{0.5}FeO_{3-\delta}$; and double perovskites (DPs): $PrBaCo_2O_{5+\delta}$, $PrBa_{0.5}Sr_{0.5}Co_2O_{5+\delta}$, $PrBa_{0.5}Sr_{0.5}CoCuO_{5+\delta}$ (650° C.), $NdBaCo_2O_{5+\delta}$, $NdBa_{0.5}Sr_{0.5}Co_2O_{5+\delta}$, $SmBaCo_2O_{5+\delta}$, $SmBa_{0.5}Sr_{0.5}Co_2O_{5+\delta}$, $GdBaCo_2O_{5+\delta}$, $GdBa_{0.5}Sr_{0.5}Co_2O_{5+\delta}$, and $YBaCo_2O_{5+\delta}$.

Compared with other materials, c-SYNC exhibits excellent ORR activity and the lowest TEC value. For example, $Sm_{0.5}Sr_{0.5}CoO_{3-\delta}$ shows high ORR activity (0.87 $\Omega cm^2$), but has a TEC of $22.3 \times 10^{-6}$ $K^{-1}$; and $Sm_{0.5}Sr_{0.5}FeO_{3-\delta}$ has a small TEC ($18.3 \times 10^{-6}$ $K^{-1}$), but shows low ORR activity (2 $\Omega cm^2$). Therefore, it confirms that a simple NTE material synthesis strategy can effectively reduce the TEC and enhance the ORR activity of a cathode, without doping less active Cu or Fe in perovskite, which reduces the TEC at the expense of the ORR activity.

Figure 28:
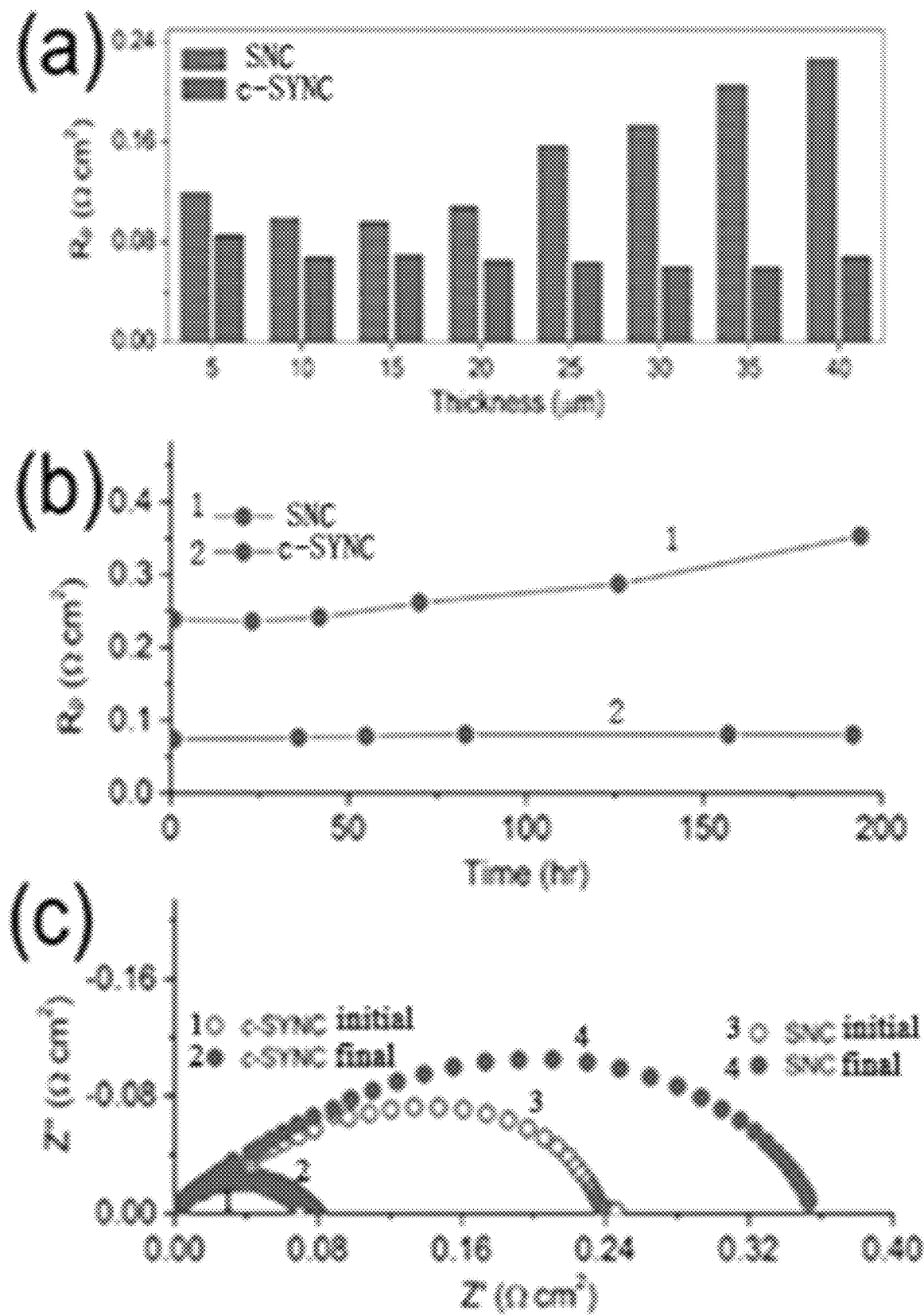
FIG. 28 shows ASR values of c-SYNC and SNC cathodes with different thicknesses in air at 600° C. (a); the ASR stability of c-SYNC and SNC cathodes in air at 600° C. during a period of 200 h (b), where the two cathodes have a thickness of 40 μm, and (c) EIS spectra of SNC and c-SYNC before and after a stability test.
Figure 29:
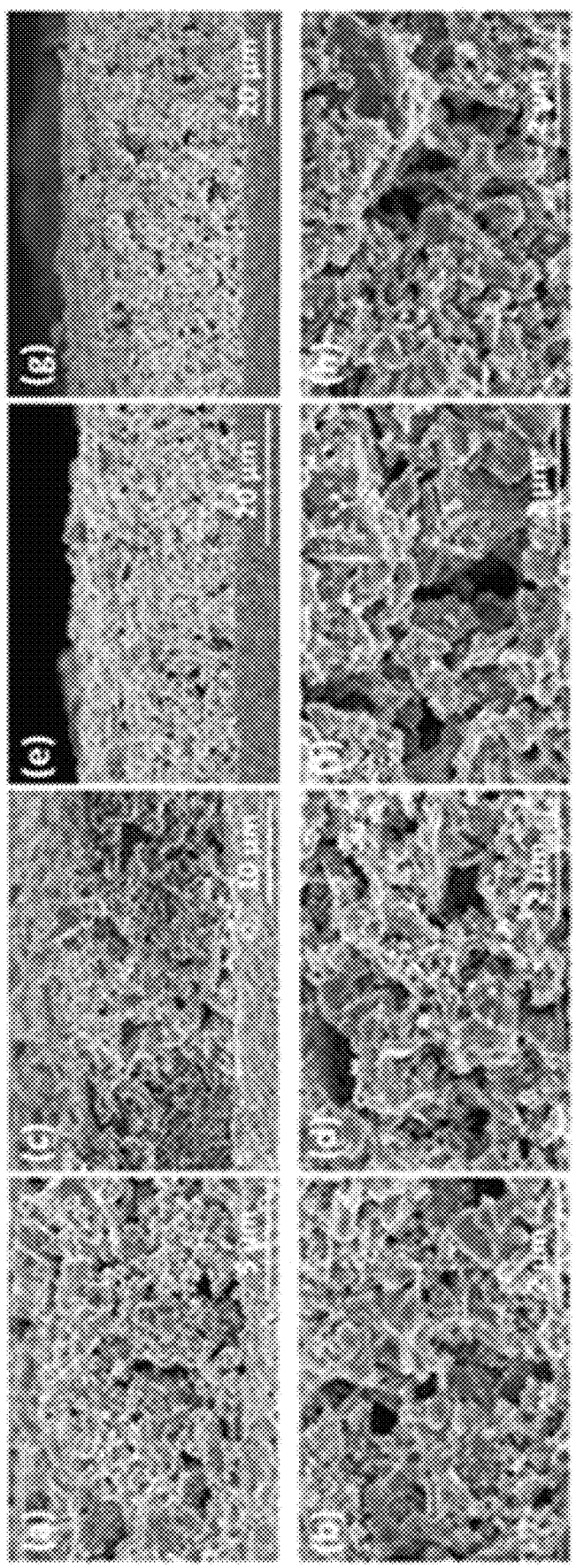
FIG. 29 shows SEM images of cross sections along a thickness and surface of a c-SYNC cathode calcined at 800° C. for 2 h in air, where (a and b) thickness=10 μm, (c and d) thickness=20 μm, (e and f) thickness=30 μm, and (g and h) thickness=40 μm.

Compared with the thermal matching of the SNC cathode, the c-SYNC cathode shows better thermal compatibility with an electrolyte layer, which can further improve the tolerance of a cell under operating conditions. The improved tolerance can be attributed to the optimization of thermal expansion of c-SYNC. Another advantage of the improved compatibility is that c-SYNC can be used to make thick cathodes for SOFCs. A thick cathode can increase the ORR catalytic active sites, shows high tolerance to cathode poisoning, and can reduce the risk of cathode spalling (which may lead to SNC cathode failure). Consequently, the impact of cathode thickness on the ORR activity of symmetric cells (FIG. 28) is investigated to demonstrate this speculation. The cathode thickness varies from 5 μm to 40 μm, with an increment of 5 μm, which is manually controlled by a spraying time during a coating process. A thickness of a coating is verified by SEM images of symmetric cells (FIG. 29). In (a) of FIG. 28, the ASR value of c-SYNC decreases from 0.084 Ωcm² to 0.059 Ωcm² when the cathode thickness increases from 5 μm to 40 μm at 600° C. Conversely, the ASR of SNC increases from 0.12 Ωcm² to 0.23 Ωcm² under corresponding conditions, indicating that the ORR activity of c-SYNC can be effectively improved by increasing the electrode thickness. It can be seen from (b) of FIG. 28 that no obvious decrease is observed during a durability test of a 40 μm-thick cathode of c-SYNC at 600° C.; and when a test time at 600° C. exceeds 200 h, the ASR value increases from 0.073 Ωcm² to 0.080 Ωcm² ((c) of FIG. 28). The above results show that there is prominent compatibility at an interface between the cathode and the electrolyte layer. In contrast, the optimal thickness of SNC is 10 μm. Because the ASR value increases from 0.23 Ωcm² to 0.35 Ωcm² during a stabilization period, a small amount of layering occurs at the 40 μm-thick SNC cathode interface, which leads to the increase in ASR. Therefore, the attempt to fabricate a thicker SNC cathode (40 μm) is not suitable for applications of SOFC cathodes.

Single Cell Performance and Stability Test

Correspondingly, the electrochemical performance of c-SYNC and SNC cathodes is further evaluated by fabricating single cells supported by a YSZ-Ni anode with an YSZ (8 μm)/SDC (5 μm) bilayer electrolyte. In the fabrication of single cells, anode-supported half-cells (NiO+YSZ/YSZ/SDC) are first fabricated by tape casting, and a c-SYNC (or SNC) cathode slurry is then sprayed on a center of an SDC surface (with a circle area of 0.45 cm²), and then calcined in air at 800° C. for 2 h.

Figure 30:
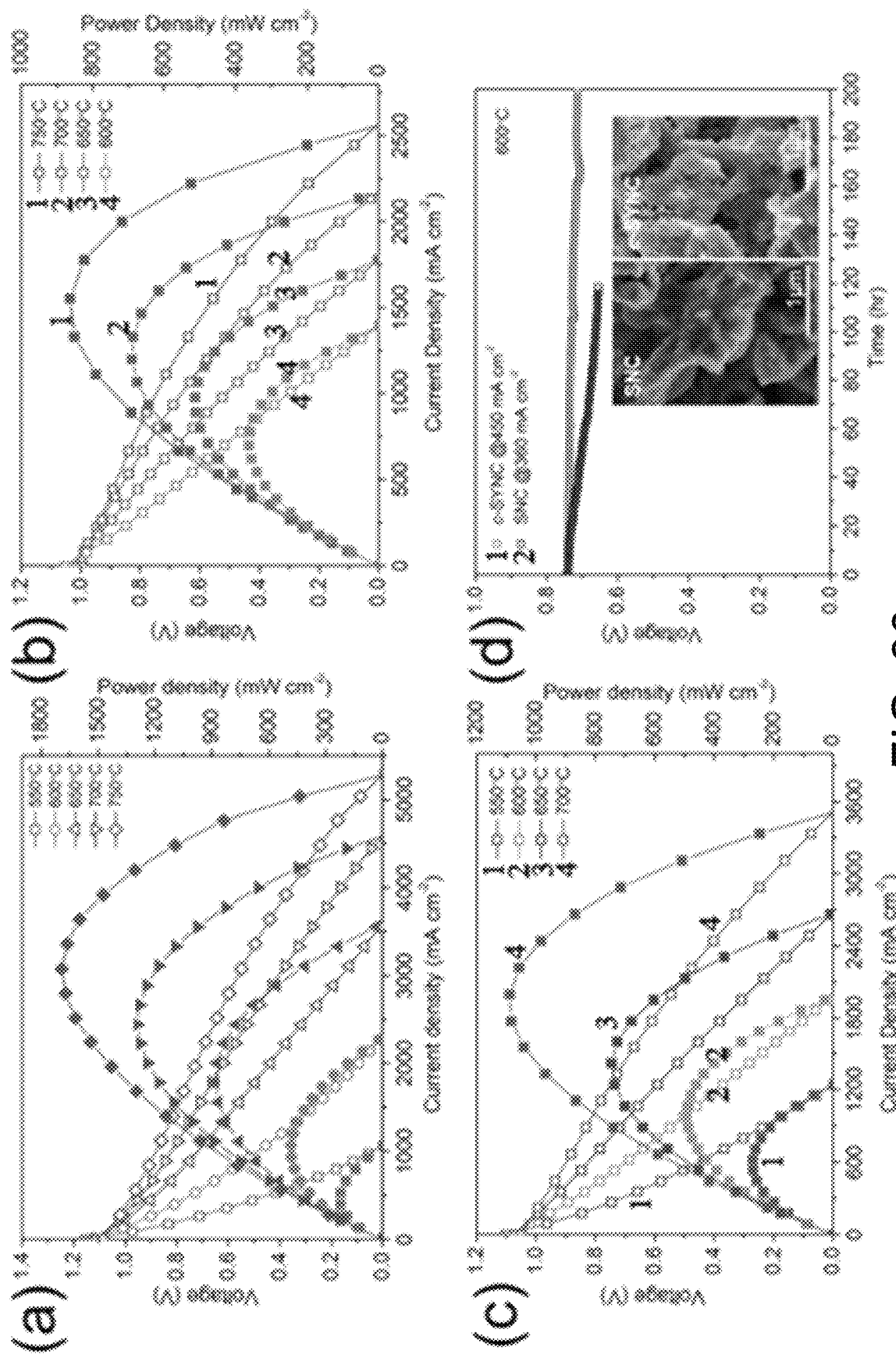
FIG. 30 shows I-V and I-P curves of an anode-supported c-SYNC single cell with a thickness of 40 μm under $H_2$ (a); I-V and corresponding I-P curves of SNC cathodes with thicknesses of 40 μm (b) and 10 μm (c) under $H_2$; and a result of a single-cell durability test conducted at 600° C. for 200 h with $H_2$ and air as a fuel and an oxidant (d), where the inset graphs are SEM cross-sectional images of c-SYNC and SNC cathodes, respectively.

As shown in (a) of FIG. 30, the maximum power densities of the 40 μm-thick c-SYNC cathode at 750° C., 700° C., and 650° C. are 1,690 mW cm⁻², 1,139 mW cm⁻², and 817 mW cm⁻², respectively, which exceed a power density of SNC. (For SNC samples, a 40 μm-thick cathode has a power density of 890 mW cm⁻² at 750° C. ((b) of FIG. 30); and a 10 μm-thick cathode has a power density of 1,088 mW cm⁻² at 700° C. ((c) of FIG. 30). As shown in (d) of FIG. 30, at 600° C., when c-SYNC and SNC are continuously operated for 200 h at constant currents of 450 mA cm⁻² and 360 mA cm⁻², respectively, the durability of a single cell of the c-SYNC cathode (40 μm) is also better than that of SNC (40 μm). SEM images of cross sections of the c-SYNC and SNC cathodes are shown in (d) of FIG. 30. The morphologies of cathodes of the two materials are significantly different. An electrode surface for c-SYNC has a fine porous honeycomb structure, indicating superior three-phase interface and mechanical stability.

Figure 31:
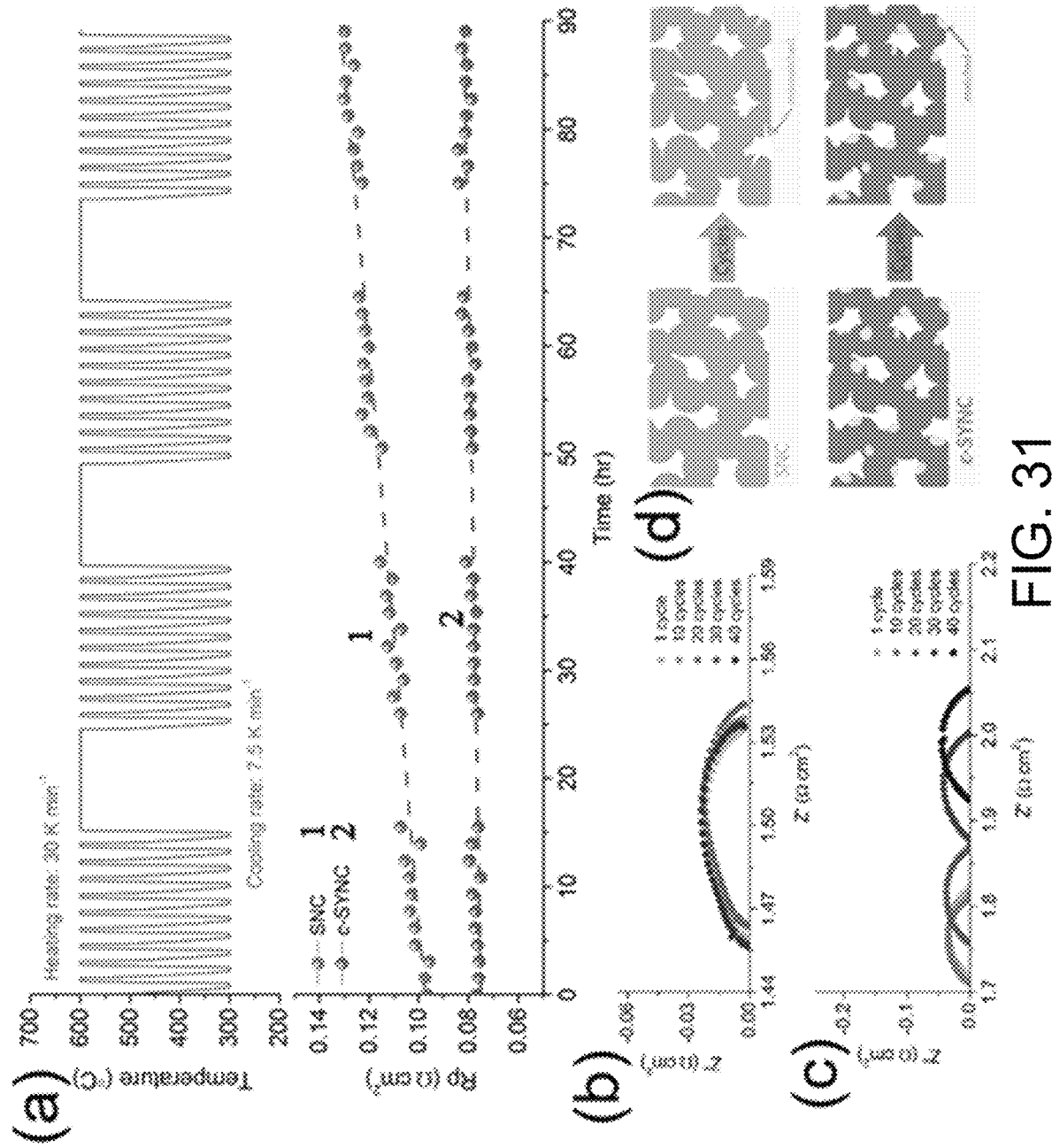
FIG. 31 shows ASR values of SNC and c-SYNC cathodes during 40 temperature cycles from 600° C. and 300° C. that last for 90 h (a); EIS values of c-SYNC (b) and SNC (c) after 1, 10, 20, 30, and 40 cycles; and a durability-enhancing mechanism proposed through in-situ formation of c-SYNCs (d).

To further evaluate the effectiveness in enhancing thermal cycling stability by reducing TEC, the change in ASR of SNC and c-SYNC symmetric cells when subjected to rigorous heating-cooling cycles. Because the risk of layering at an electrolyte-electrode interface can be reduced by optimizing the TEC matching of a c-SYNC cathode, a thickness of an SNC cathode is set to 10 μm and a thickness of c-SYNC is set to 40 μm. A rate of programmed temperature from 300° C. to 600° C. is set to 30° C. min⁻¹, and a cell is stabilized for 10 min, tested for resistance, then immediately cooled to 300° C. (at an average rate of 7.5° C. min⁻¹), and stabilized for 10 min to complete a cycle. It can be seen from (a) of FIG. 31 that, after 40 cycles, the ASR of c-SYNC only increases from 0.075 Ωcm² to 0.081 Ωcm², but the ASR of the SNC cathode increases from 0.095 Ωcm² to 0.12 Ωcm². The changes in EIS values of c-SYNC and SNC after thermal cycling as shown in (b) of FIG. 31 and (c) of FIG. 31 also confirm that c-SYNC has better tolerance than SNC. It can be found that the Rn of SNC increases, indicating that the interfacial resistance between the electrolyte and the cathode increases after cycling. As shown in (d) of FIG. 31, the improved tolerance can alleviate the problem of interfacial layering. By forming a composite with YWO, a more compatible TEC is produced for the entire cathode layer deposited and calcined, thereby reducing a stress at a cathode-cathode interface. The frangible SNC-electrolyte interfaces (sintering necks) can be replaced by the formed c-SYNC-electrolyte, which has a more compatible TEC and thus can reduce a thermal strain between c-SYNC and an electrolyte.

What is claimed is:

1. A preparation method of a composite of a cobalt-based perovskite material with a negative thermal expansion material, wherein the composite of the cobalt-based perovskite material with the negative thermal expansion material is obtained by combining the negative thermal expansion material with the cobalt-based perovskite material; the negative thermal expansion material is $Y_2W_3O_{12}$, and the cobalt-based perovskite material is $SrNb_{0.1}Co_{0.9}O_{3-\delta}$; and the preparation method comprises the following steps:
mixing the negative thermal expansion material and the cobalt-based perovskite material to obtain a precursor material, and subjecting the precursor material to calcination;

wherein a content of the negative thermal expansion material in the precursor material is 5 wt % to 40 wt %; and the calcination is conducted at 600° ° C. to 1,000° ° C. for 1 h to 6 h.

2. The preparation method of the composite of the cobalt-based perovskite material with the negative thermal expansion material according to claim 1, wherein the content of the negative thermal expansion material in the precursor material is 10 wt % to 20 wt %.

3. The preparation method of the composite of the cobalt-based perovskite material with the negative thermal expansion material according to claim 1, wherein the calcination is conducted at 650° ° C. to 800° C. for 2 h.

4. The preparation method of the composite of the cobalt-based perovskite material with the negative thermal expansion material according to claim 1, wherein the $SrNb_{0.1}Co_{0.9}O_{3-\delta}$ is prepared by taking $Sr(NO_3)_2$, $C_{10}H_5NbO_{20}$, and $Co(NO_3)_2 \cdot 6H_2O$ according to a predetermined molecular stoichiometric ratio to prepare a solid precursor by a citrate-ethylenediamine tetraacetic acid complexing method, and subjecting the solid precursor to calcination.

5. The preparation method of the composite of the cobalt-based perovskite material with the negative thermal expansion material according to claim 1, wherein the $Y_2W_3O_{12}$ is prepared by taking $Y_2O_3$ powder and $WO_3$ powder as raw materials according to a predetermined stoichiometric ratio, mixing the raw materials to obtain a resulting mixture, and subjecting the resulting mixture to ball-milling and calcination.

\* \* \* \* \*